(12) United States Patent
Siddiqui

(10) Patent No.: US 10,564,681 B2
(45) Date of Patent: Feb. 18, 2020

(54) HINGED DEVICE

(71) Applicant: Microsoft Technology Licensing, LLC, Redmond, WA (US)

(72) Inventor: Kabir Siddiqui, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/275,097

(22) Filed: Feb. 13, 2019

(65) Prior Publication Data

US 2019/0278338 A1 Sep. 12, 2019

Related U.S. Application Data

(60) Provisional application No. 62/644,300, filed on Mar. 16, 2018, provisional application No. 62/641,103, filed on Mar. 9, 2018.

(51) Int. Cl.
*G06F 1/16* (2006.01)
*F16C 11/04* (2006.01)
(Continued)

(52) U.S. Cl.
CPC ............ *G06F 1/1681* (2013.01); *E05D 7/00* (2013.01); *E05D 11/00* (2013.01); *F16C 11/04* (2013.01);
(Continued)

(58) Field of Classification Search
CPC .... G06F 1/1681; G06F 1/1652; G06F 1/1616; G06F 1/1618
See application file for complete search history.

(56) References Cited

U.S. PATENT DOCUMENTS 9,348,450 B1 * 5/2016 Kim ..................... G06F 1/1681
2012/0120618 A1 5/2012 Bohn
(Continued)

FOREIGN PATENT DOCUMENTS

EP 1464784 A1 10/2004
EP 2728432 A1 5/2014
(Continued)

OTHER PUBLICATIONS

"International Search Report & Written Opinion for PCT Application No. PCT/US19/020179", dated May 24, 2019, 11 Pages.
(Continued)

*Primary Examiner* — Nidhi Thaker
(74) *Attorney, Agent, or Firm* — Rainier Patents, P.S.

(57) ABSTRACT

The description relates to hinge devices. One example relates to a device that has a first portion and a second portion. The device can include a hinge assembly secured to the first portion and the second portion and a flexible display secured to the first portion and the second portion. The device can include a biasing element that biases the first portion away from the hinge assembly. The device can further include a cord that extends along a pathway between the first portion and the hinge assembly. A length of the pathway can change as the first and second portions are rotated around the hinge assembly, such that at a first orientation the biasing element biases the first portion away from the hinge assembly and at a second orientation, the cord overcomes the bias and pulls the first portion toward the hinge assembly.

20 Claims, 18 Drawing Sheets

(51) Int. Cl.
*E05D 11/00* (2006.01)
*E05D 7/00* (2006.01)
*E05D 11/08* (2006.01)
*E05D 3/12* (2006.01)

(52) U.S. Cl.
CPC .......... *G06F 1/1616* (2013.01); *G06F 1/1618* (2013.01); *G06F 1/1652* (2013.01); *G06F 1/1656* (2013.01); *E05D 3/122* (2013.01); *E05D 11/082* (2013.01); *E05Y 2900/606* (2013.01)

(56) References Cited

U.S. PATENT DOCUMENTS

| | | |
|---|---|---|
| 2012/0307472 A1 | 12/2012 | Bohn et al. |
| 2013/0021762 A1* | 1/2013 | van Dijk ............... G06F 1/1652 361/749 |
| 2014/0042293 A1* | 2/2014 | Mok ..................... G06F 1/1652 248/682 |
| 2014/0111954 A1* | 4/2014 | Lee ....................... G06F 1/1641 361/749 |
| 2015/0077917 A1 | 3/2015 | Song |
| 2015/0185782 A1 | 7/2015 | Kim et al. |
| 2015/0233162 A1* | 8/2015 | Lee ........................ H04M 1/02 16/223 |
| 2015/0241978 A1 | 8/2015 | Lombardi et al. |
| 2015/0378397 A1 | 12/2015 | Park et al. |
| 2016/0085265 A1* | 3/2016 | Park ..................... G06F 1/1681 361/807 |
| 2016/0109908 A1 | 4/2016 | Siddiqui |
| 2017/0013729 A1 | 1/2017 | Rothkopf et al. |
| 2017/0060188 A1 | 3/2017 | Han et al. |
| 2017/0201607 A1 | 7/2017 | Xu |
| 2018/0196468 A1 | 7/2018 | Watamura et al. |
| 2018/0213663 A1* | 7/2018 | Lin ........................ G06F 1/1618 |
| 2018/0292860 A1* | 10/2018 | Siddiqui ............... G06F 1/1618 |

FOREIGN PATENT DOCUMENTS

| | | | |
|---|---|---|---|
| EP | 2728433 A1 | 5/2014 | |
| EP | 3109847 A1 | 12/2016 | |
| EP | 3386172 A1 * | 10/2018 | ............... G06F 1/16 |
| EP | 3386172 A1 | 10/2018 | |
| WO | 2017114465 A1 | 7/2017 | |

OTHER PUBLICATIONS

"Non Final Office Action Issued in U.S. Appl. No. 15/656,776", dated Jul. 30, 2019, 12 Pages.

"Applicant Inititated Interview Summary Issued in U.S. Appl. No. 15/656,776", dated Dec. 4, 2018, 3 Pages.

"Final Office Action issued in U.S. Appl. No. 16/656,776", dated Mar. 22, 2019, 12 Pages.

"Non Final Office Action issued in U.S. Appl. No. 15/656,776", dated Sep. 11, 2018, 11 Pages.

"International Search Report and Written Opinion issued in PCT Application No. PCT/US2018/024698", dated Jun. 8, 2018, 13 Pages.

Price, Rob, "Analysts think that Samsung will launch a smartphone with a foldable screen this year", Retrieved From: http://www.businessinsider.in/Analysts-think-that-Samsung-will-lauch-a-smartphone-with-a-foldable-screen-this-year/articleshow/50469072.cms, Jan. 6, 2016, 37 Pages.

* cited by examiner

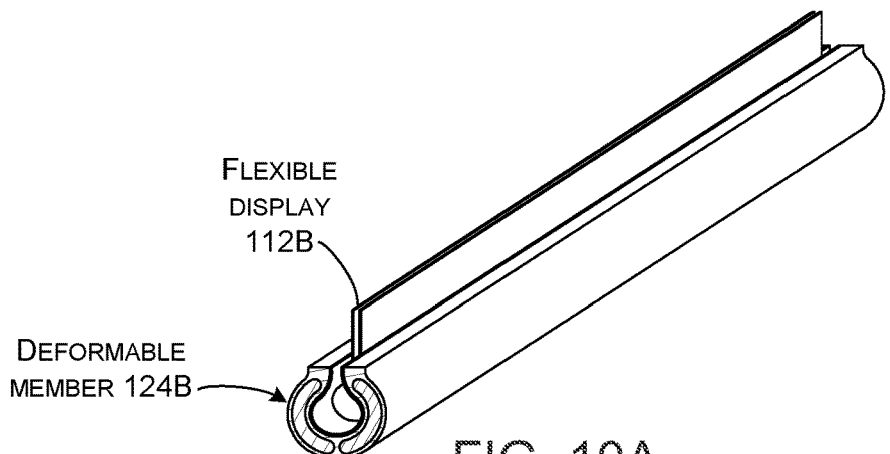
FIG. 10A
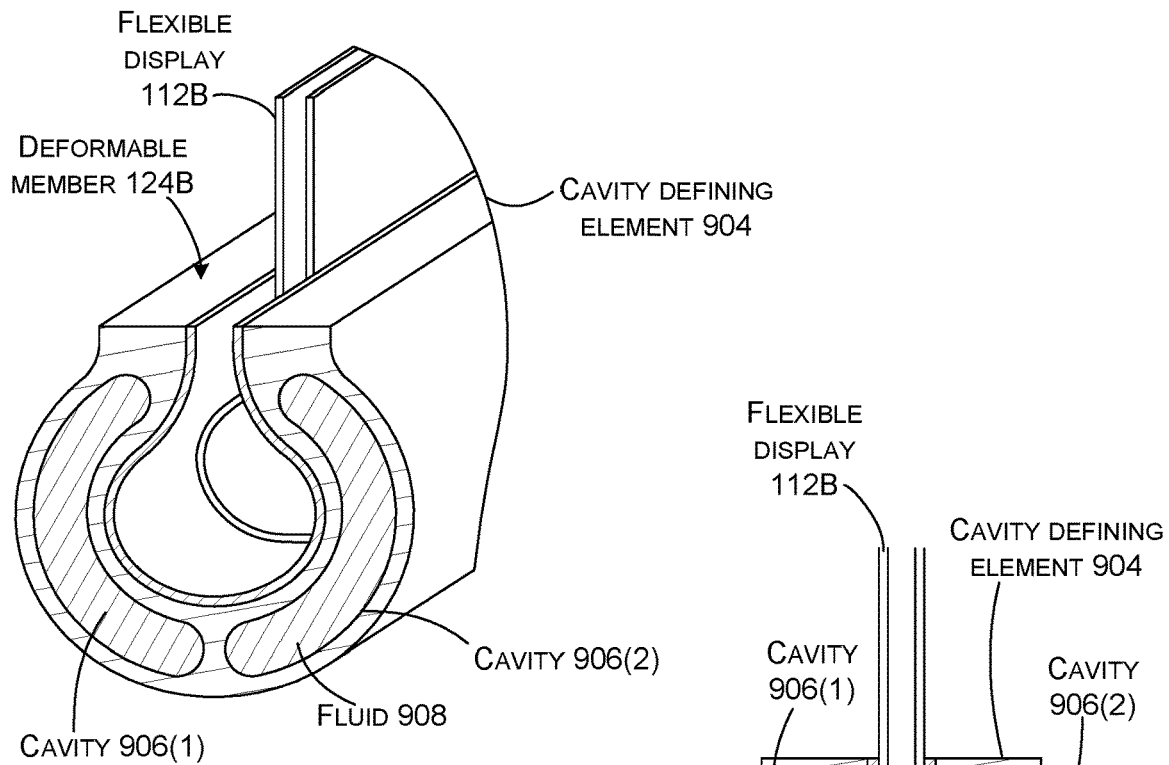
FIG. 10B
FIG. 10C

HINGED DEVICE

PRIORITY

This utility patent application claims priority from U.S. Provisional Patent Application 62/641,103, filed on Mar. 9, 2018 and from U.S. Provisional Patent Application 62/644,300, filed on Mar. 16, 2018, which are hereby incorporated by reference in their entirety.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

FIGS. 3A, 4A, 4B, 6A, 7A, and 10A-10B show perspective views of example devices in accordance with some implementations of the present concepts.

FIGS. 5A-5E, 8A-8D, 9A-9B, and 10C show sectional views of example devices in accordance with some implementations of the present concepts.

DESCRIPTION

The present concepts relate to devices, such as computing devices employing hinge assemblies that can rotationally secure first and second device portions. A flexible display can be secured to both the first and second portions. The hinge assembly can provide several features that facilitate the use of a single flexible display. During rotation of the first and second portions, the hinge assembly can change the length of the device that lies beneath the flexible display to reduce stresses imparted on the flexible display. This aspect can be achieved with a cord that connects the first portion to the hinge assembly. A length of a pathway of the cord can change during the rotation so that the cord draws the first portion toward the hinge assembly and/or allows the first portion to be biased away from the hinge assembly depending on the orientation.

Figure 1:
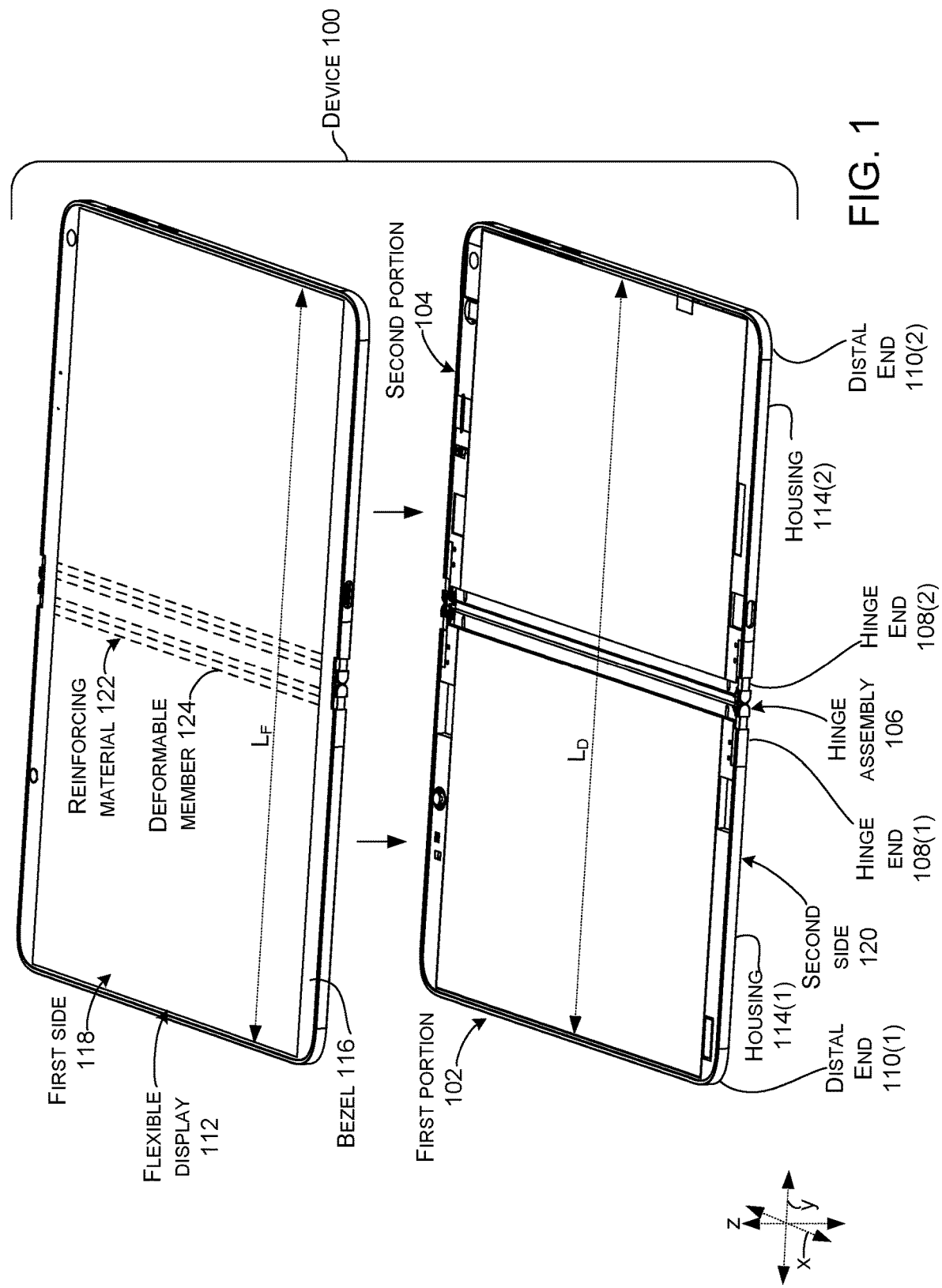
FIGS. 1, 3C, 4C, 6B, and 7B show exploded perspective views of example devices in accordance with some implementations of the present concepts.

Introductory FIG. 1 shows an example device 100 that has first and second portions 102 and 104 that are rotatably secured together by a hinge assembly 106.

The first portion 102 and the second portion 104 can extend from a hinge end 108 to a distal end 110. A flexible display 112 can be positioned over the first portion 102, the hinge assembly 106, and the second portion 104. An example flexible display that is commercially available is an organic light emitting diode (OLED) display, though other types may be available and/or become available. The flexible display can be secured to a housing 114 of both the first and second portions at a bezel 116. For purposes of explanation, the device can be described as having a first side or surface 118 (facing upwardly in FIG. 1) upon which the flexible display 112 is positioned and a second opposite side or surface 120 (facing downwardly in FIG. 1).

A reinforcing material 122 (shown in ghost because it underlies the flexible display 112) can be positioned between the flexible display 112 and the hinge assembly 106. The reinforcing material 122 can support the flexible display 112 over the hinge assembly 106. In this case, the re-enforcing material entails a deformable member 124, such as an elastomeric material. In this example, the deformable member 124 entails a corrugated pattern extending along the hinge assembly 106. The corrugated pattern can be on one side (shown) or both sides. The corrugated pattern can allow the deformable member to accommodate a range of orientations as will be explained below relative to FIGS. 1-8D. An alternative deformable member configuration is described below relative to FIGS. 9A-10C.

Figure 2:
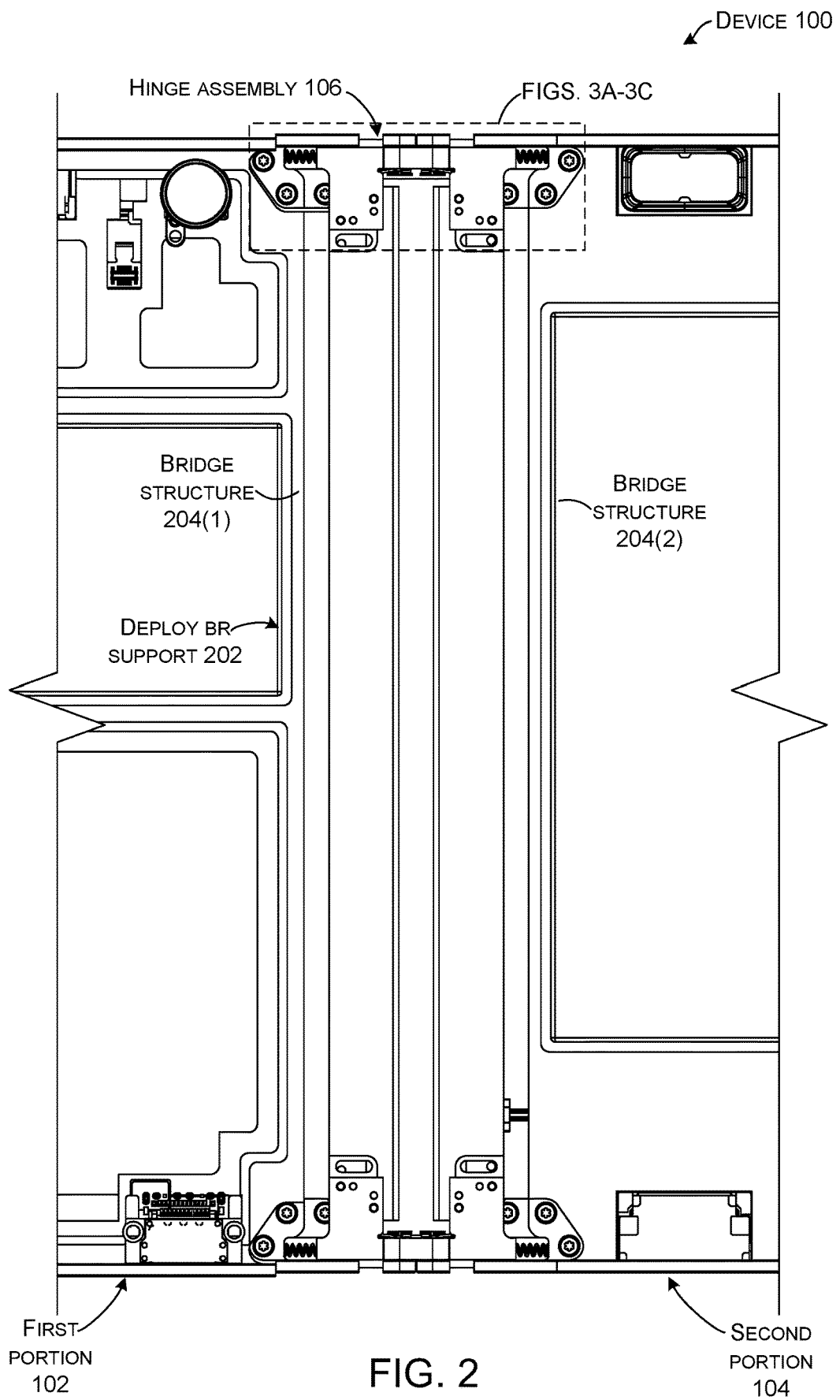
FIG. 2 shows an elevational view of an example device in accordance with some implementations of the present concepts.

The deformable member 124 can be configured to be positioned between the flexible display 112 and the hinge assembly (106, FIGS. 1 and 2). In the open orientation of FIG. 1, the deformable member 124 can function to support the flexible display 112 over the hinge assembly 106 to create a uniform tactile feel across the device 100. Stated another way, without the deformable member 124, the flexible display might feel 'mushy' to the user over the hinge assembly 106 and solid over the first and second portions 102 and 104.

The flexible display 112 can be fixedly secured to both the first and second portions 102 and 104. The flexible display 112 can have a length $L_F$. The portion of the device 100 underlying the flexible display 112 can have a length $L_D$. To facilitate the fixedly secured configuration, the hinge assembly 106 can change the length $L_D$ of the device 100 underlying the flexible display at various orientations of the rotation to reduce forces being imparted on the flexible display. Briefly, at the 180-degree orientation of FIG. 1, the length of the device $L_D$ and the length of the flexible display $L_F$ are approximately equal. The flexible display tends to be above the neutral axis of the device. As such during rotation, the length of the flexible display would traditionally have to change during rotation. Instead, in the present implementations, the hinge assembly can change length $L_D$ during rotation to accommodate the flexible display. This aspect will be discussed in more detail below relative to FIGS. 5A-5E and 8A-8D.

FIG. 2 shows regions of the first and second portions 102 and 104 joined to the hinge assembly 106 and oriented at 180-degrees. The flexible display 112 and the deformable member 124 have been removed to show underlying elements. The hinge assembly can include a deployable bridge support 202 that can be deployed to support the flexible display at the hinge assembly when the first and second portions are rotated from a closed orientation to an open orientation.

In this case, the deployable bridge support 202 can entail a bridge structure 204 that can be deployed over the hinge assembly 106 in the 180-degree orientation. In this particular configuration, two bridge structures 204(1) and 204(2) are employed. The first bridge structure 204(1) can be associated with the first portion 102, and the second bridge structure 204(2) can be associated with the second portion 104. When deployed in the 180-degree orientation, the bridge structures can cooperatively support the flexible display 112 at the hinge assembly 106. In this example, the bridge structures 204 directly support the deformable member (124, FIG. 1), and thus indirectly support the flexible display (112, FIG. 1). In other examples, the bridge structures 204 can directly support the flexible display 112 (e.g. contact the flexible display).

The support offered by the bridge structures 204 can contribute to tactile symmetry across the flexible display 112 over the first portion 102, the hinge assembly 106, and the second portion 104 in the 180-degree orientation and/or other orientations (e.g., the flexible display can feel substantially the same to the user across the entire device 100).

When the first and second portions 102 and 104 are rotated to other orientations (e.g., less than or more than 180 degrees) the bridge structures 204 can move to allow room for the flexible display (112, and/or the deformable member 124, FIG. 1) to bend at the hinge assembly 106.

FIGS. 3A-3C, 4A-4C, and FIGS. 5A-5E collectively show more details of hinge assembly 106.

Figure 3A:
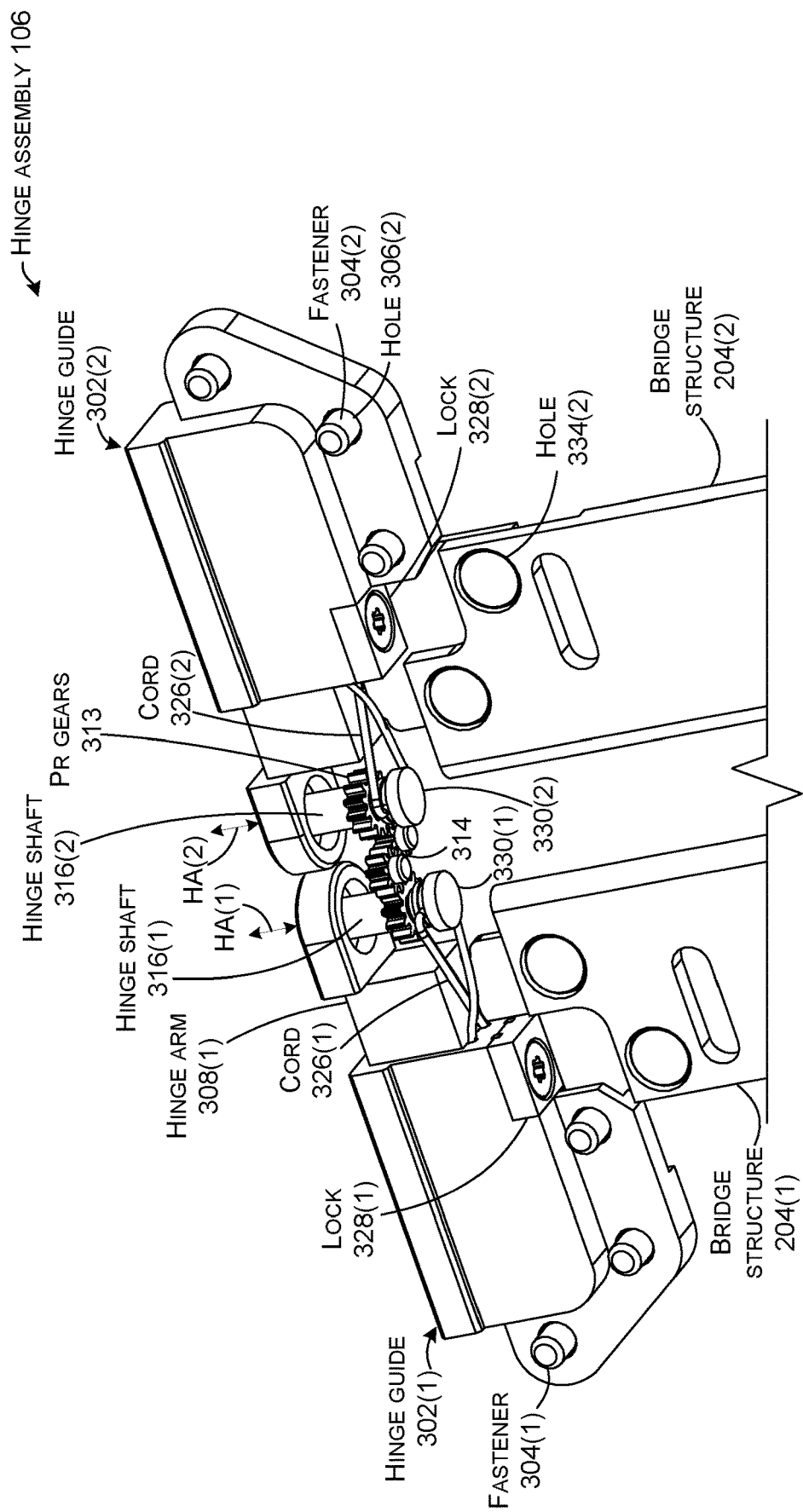
Figure 3B:
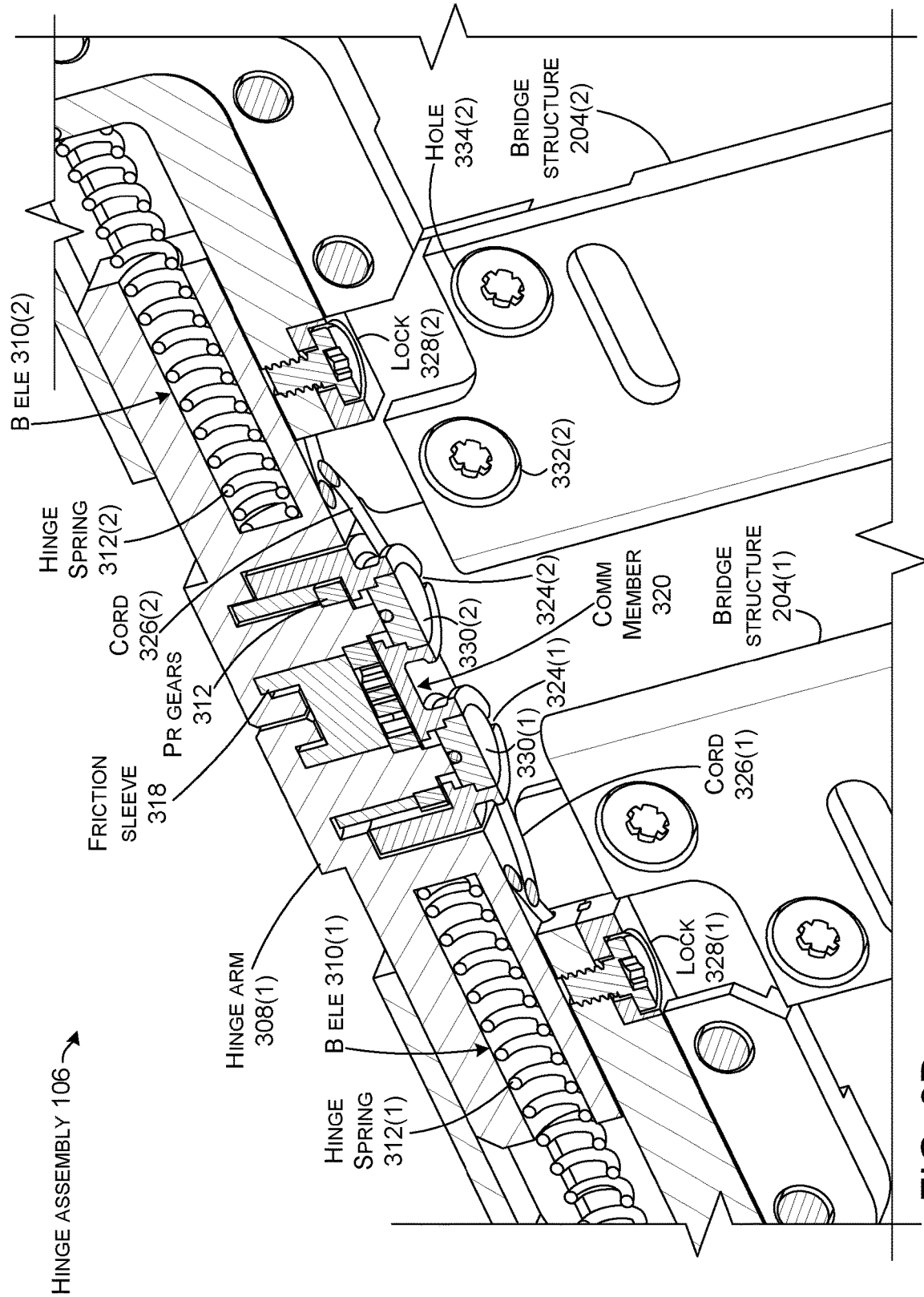
FIG. 3B shows a sectional perspective view of an example device in accordance with some implementations of the present concepts.
Figure 3C:
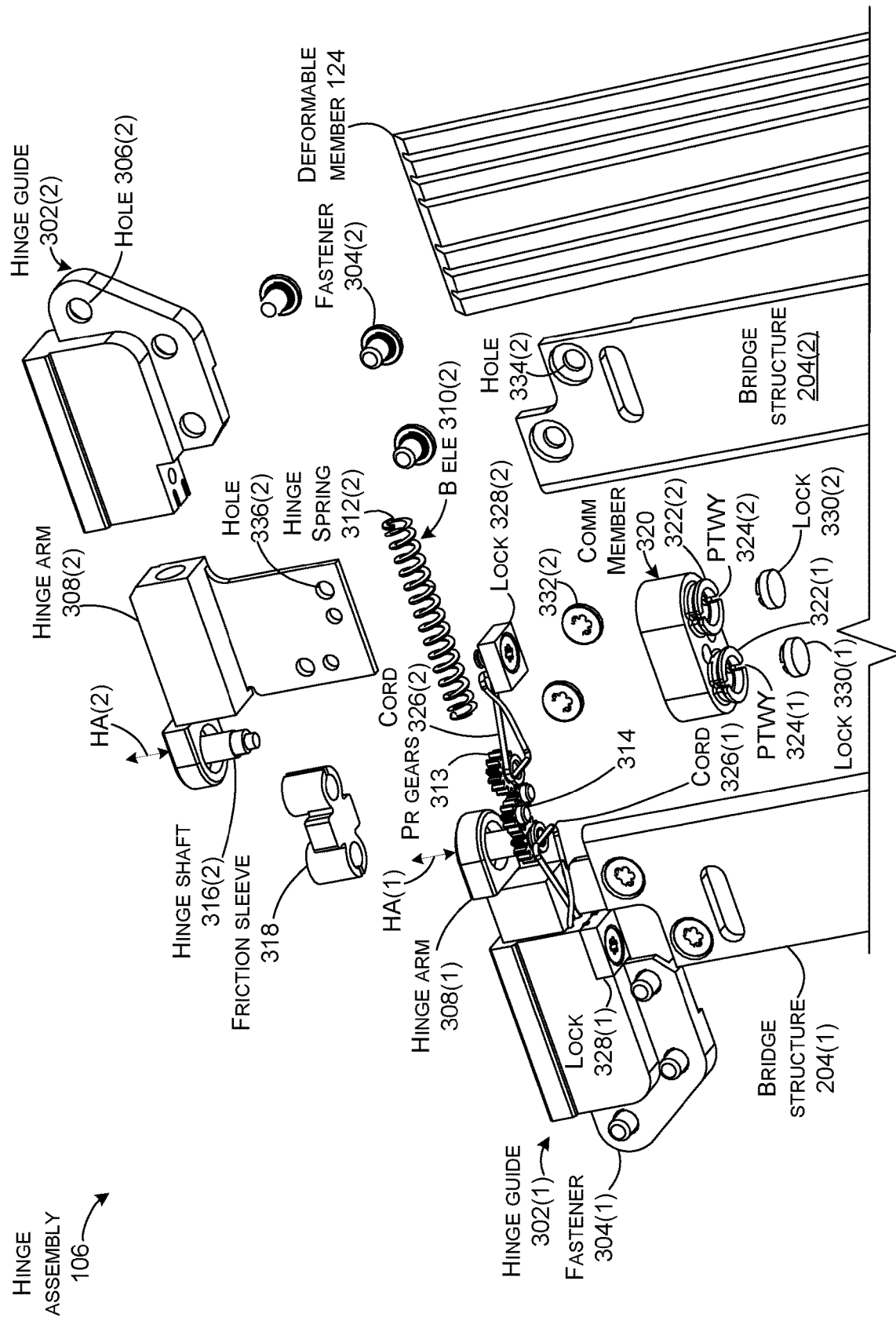
Figure 4A:
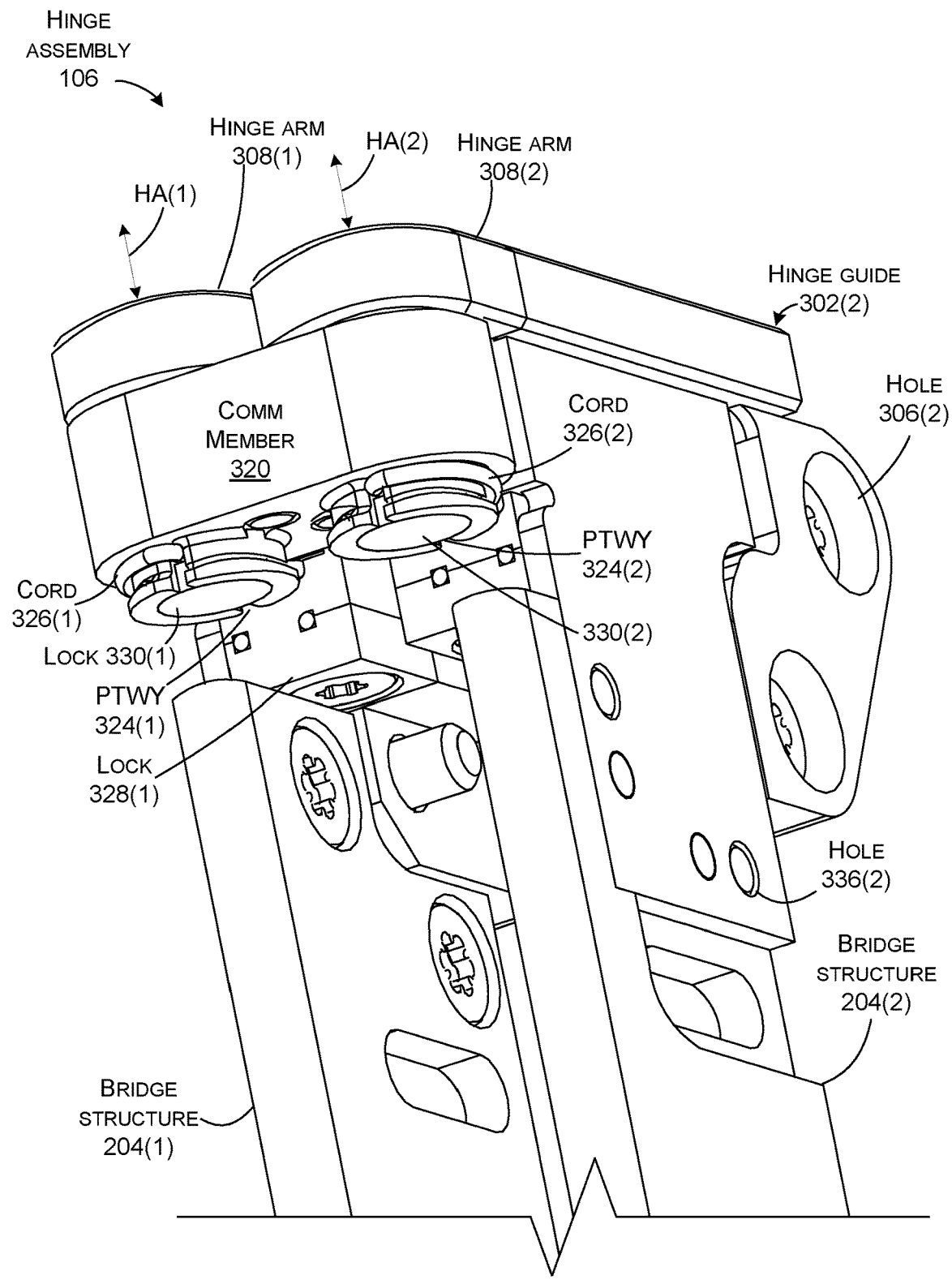
Figure 4B:
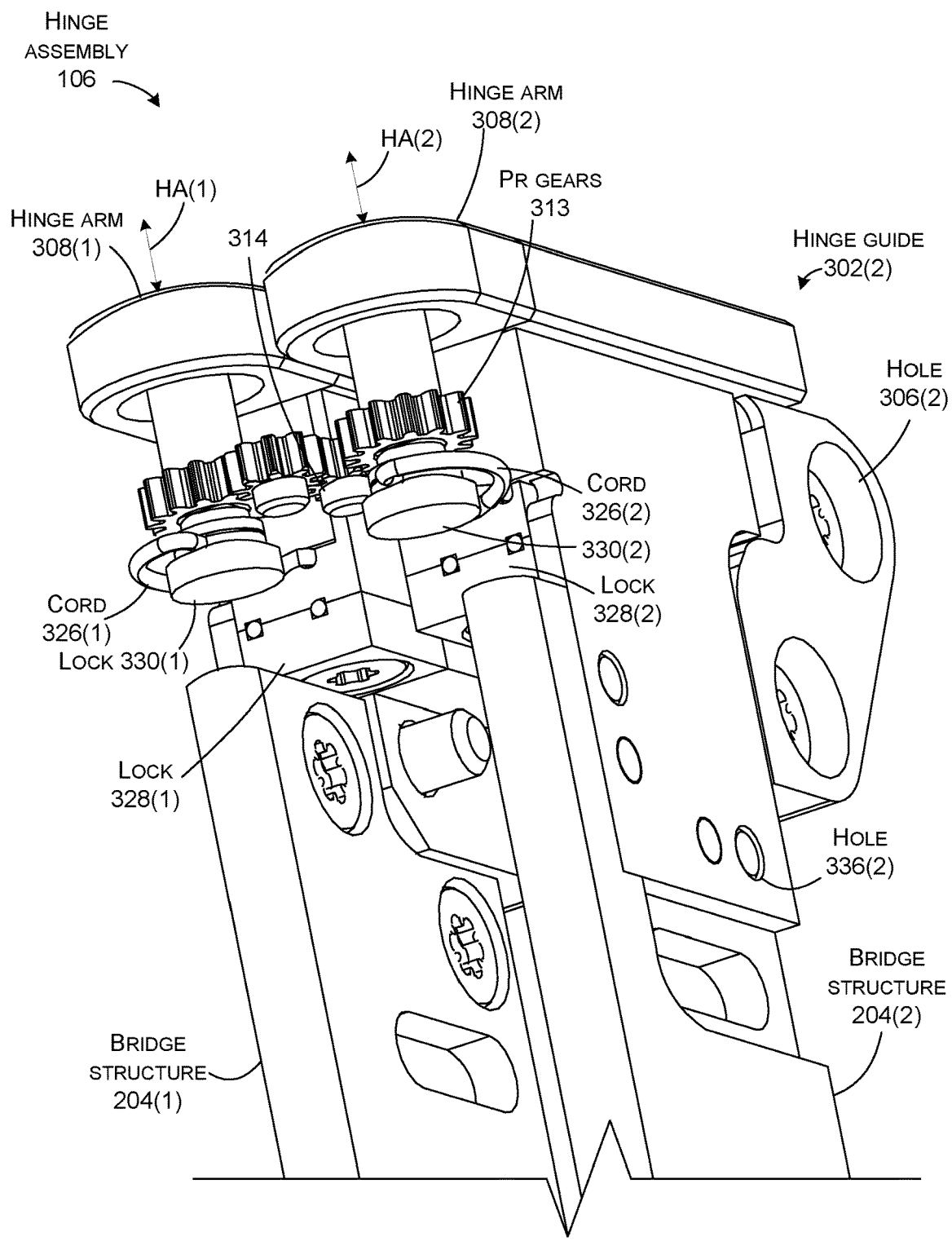
Figure 4C:
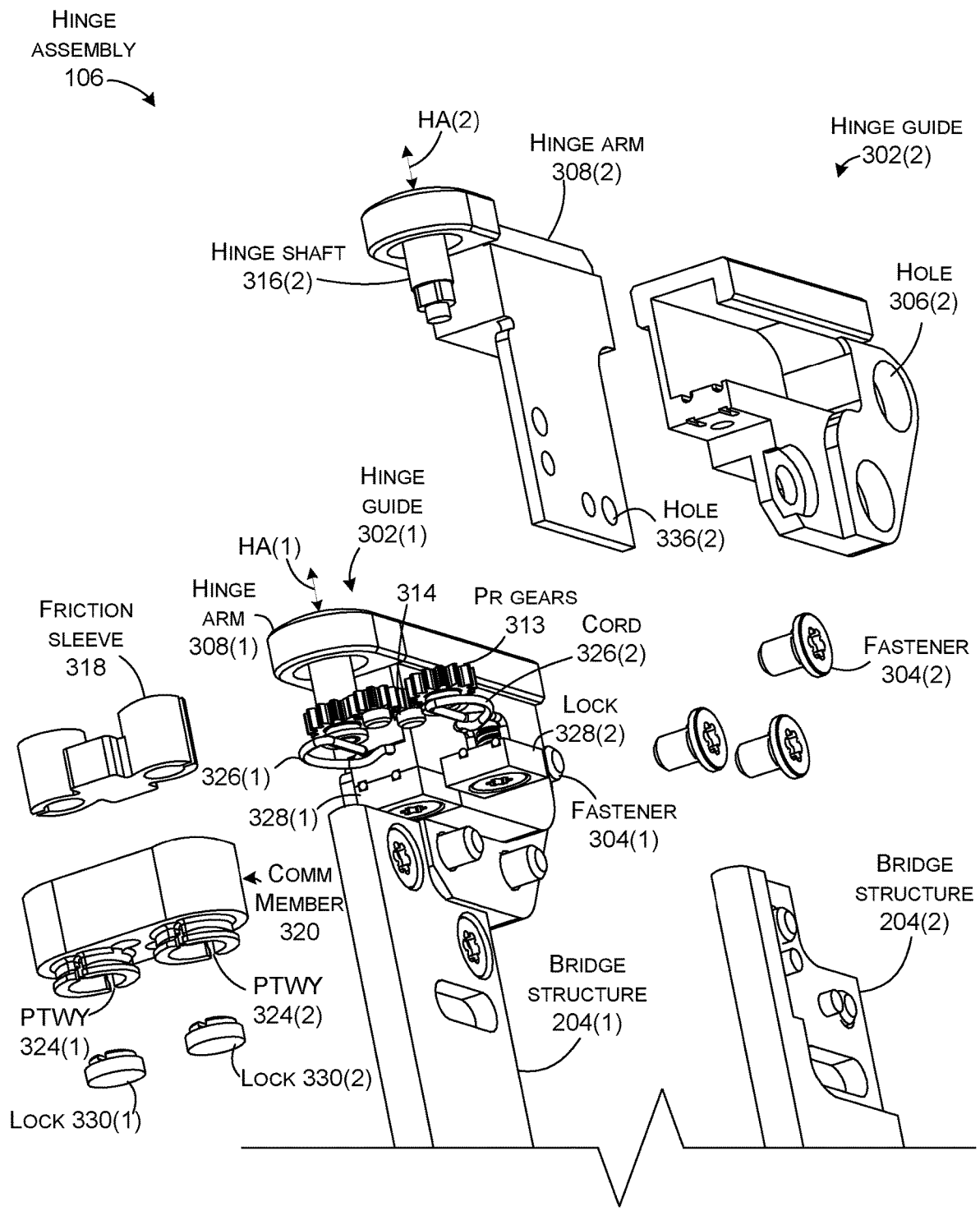

FIGS. 3A-3C show hinge assembly 106 at the 180-degree orientation (as indicated in FIG. 2). FIG. 3A is a perspective view (with some components removed), FIG. 3B is a cut-away perspective view, and FIG. 3C is an exploded perspective view. FIGS. 4A-4C show a portion of hinge assembly 106 at the zero-degree orientation. FIG. 4A is a perspective view, FIG. 4B is a similar perspective view with some components removed, and FIG. 4C is an exploded perspective view.

Example hinge assembly 106 can include hinge guides 302 that can be secured to housings 114 (FIG. 1) by fasteners 304 through holes 306 (not all of which are shown or designated with specificity). The hinge guides 302 can slideably receive hinge arms 308. A biasing element 310, such as hinge springs 312 can bias the hinge guides 302 and the hinge arms 308 apart (e.g., away) from one another.

The hinge arms 308 can include primary gears 313 which can interact with secondary gears 314. (An alternative implementation can omit the secondary gears and employ directly engaging primary gears). The primary and secondary gears can control rotation of the hinge arms 308 so that equal degrees of rotation occur around each hinge axis HA. For instance, 20 degrees of rotation of hinge arm 308(1) around hinge axis HA(1) occurs concurrently with 20 degrees of rotation of hinge arm 308(2) around hinge axis HA(2). Other synchronizing elements besides gears can be employed in other implementations.

The hinge arms 308 can include hinge shafts 316. The hinge shafts 316 can define hinge axes (HA) of the hinge assembly 106. The hinge shafts 316 can be positioned relative to a friction sleeve 318. The friction sleeve 318 can in turn be received in a communication member 320. The friction sleeves 318 can provide resistance to rotation between the communication member 320 and the hinge arms 308 so that the hinge arms maintain an orientation set by the user until the user changes the orientation (e.g., the device maintains whatever orientation the user puts it in).

Spindles 322 can be defined by the communication member 320. Alternatively, the spindles can be positioned on the ends of the hinge shafts 316 (and/or incorporated with the primary gears 312). The spindles 322 can define a portion of pathways (PTWY) 324. Cords 326 can travel along the pathway 324. The cords 326 can be secured to the hinge guides 302. In this case, the cords are secured to the hinge guides by locks 328. Similarly, the hinge shafts 316 can be retained by locks 330. Finally, the bridge structures 204 can be secured to the hinge arms 308, such as by fasteners 332 through holes 334 and 336 (not all of which are designated with specificity). The bridge structures 204 can support the deformable member 124 (shifted to the side in FIG. 3C) in the 180-degree orientation.

Figure 5A:
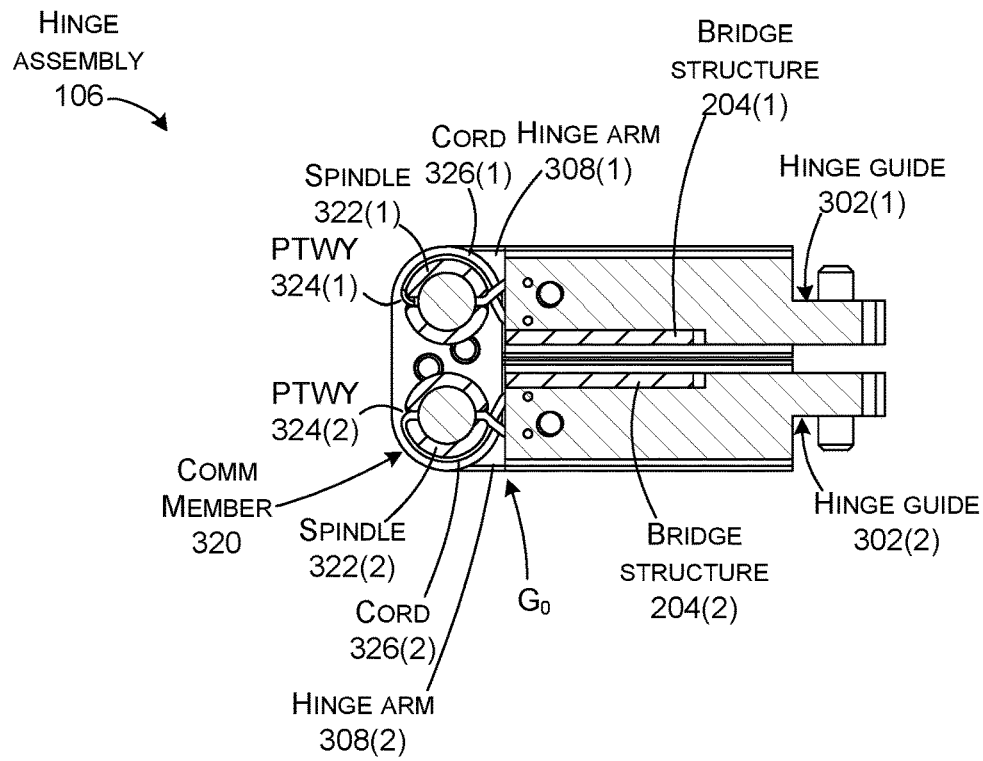

FIG. 5A shows the hinge assembly 106 in the zero-degree orientation (e.g., first and second portions 102 and 104 would be almost touching with flexible display 112 positioned in between (See FIG. 1)) with bridge structures 204 facing inwardly (See FIG. 2). In this orientation, the pathways 324 are relatively long for cords 326. The long pathways 324 cause the cords 326 to extend from the bridge structures 204, halfway around the spindles 322 to a point opposite to the hinge guides 302. This relatively long pathway 324 causes the cords 326 to overcome the bias of springs 312 (FIG. 3C) and the cords pull the hinge guides 302 until the hinge guides contact the hinge arms 308 proximate to the communication member 320. Stated another way, the pathways 324 causes the cords 326 to pull the hinge guides 302 toward the hinge assembly until a gap ($G_0$) between the hinge guides and the hinge arms 308 is zero.

Figure 5B:
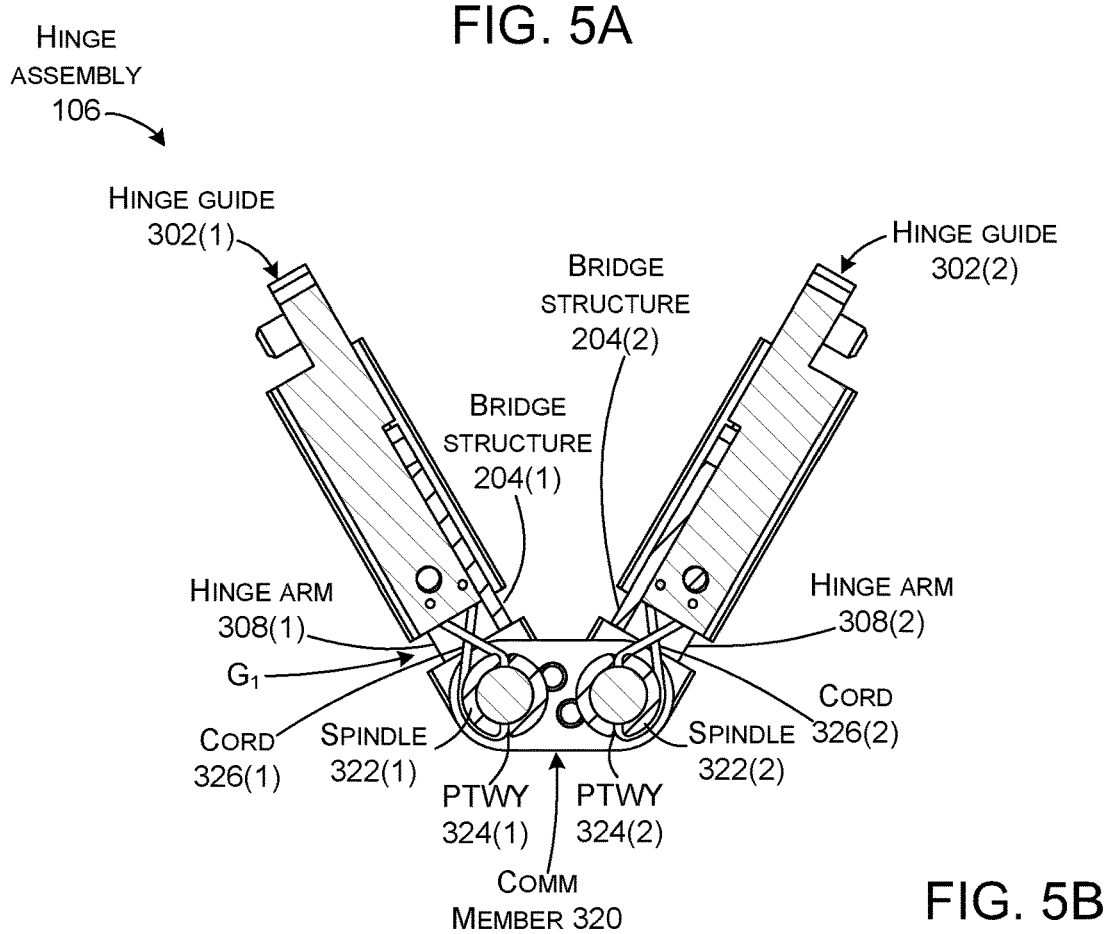

FIG. 5B shows the hinge assembly 106 at an acute orientation of about 60 degrees. At this orientation, the pathways 324 experienced by the cords 326 is shorter than in the zero-degree orientation of FIG. 5A. For instance, in FIG. 5A the farthest point of the pathway is directly opposite to the hinge guide. In FIG. 5B, the farthest point of the pathway has rotated toward the hinge arm. As a result of the shorter pathway, the cords cans allow springs 312 (FIG. 3C) to bias the hinge guides 302 away from the communication member 320. This movement is evidenced by gap $G_1$ between the hinge guides 302 and the hinge arms 308 being larger than gap $G_0$ at the zero-degree orientation of FIG. 5A.

Figure 5C:
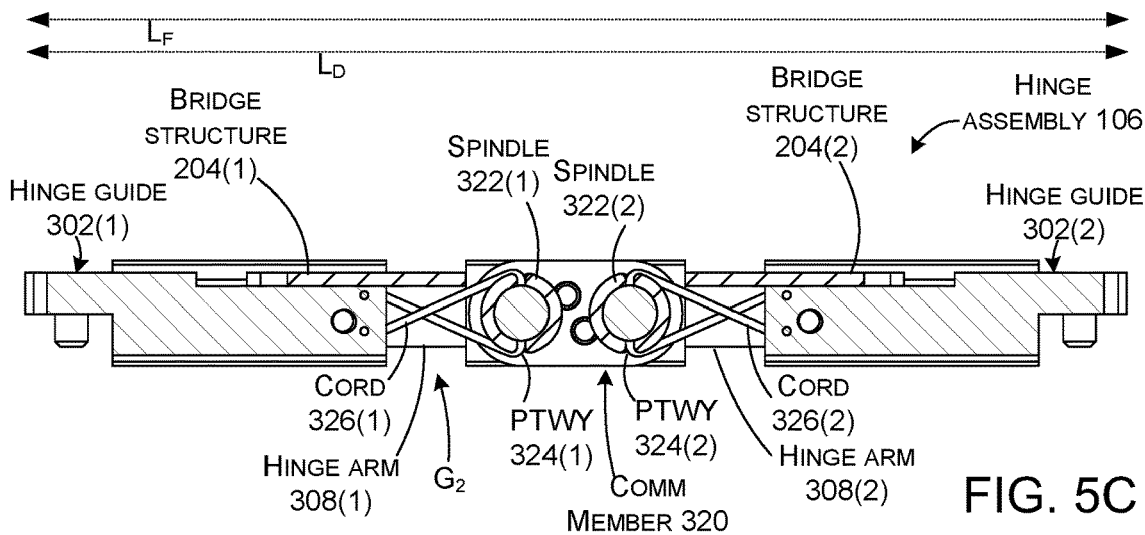

FIG. 5C shows the hinge assembly 106 at the 180-degree orientation. At this orientation, the pathways 324 experienced by the cords 326 is shorter than in the 60-degree orientation of FIG. 5B. As such, springs 312 (FIG. 3C) can bias the hinge guides 302 farther away from the communication member 320. This movement is evidenced by gap $G_2$ between the hinge guides 302 and the hinge arms 308 being larger than gaps $G_1$ and $G_0$ at the orientations of FIGS. 5B and 5A, respectively. In this particular implementation, gap $G_2$ at the 180-degree orientation is the largest gap experienced during the range of rotation. Note that at this point, the pathway through the spindles 322 is parallel to the ends of the hinge arms 308 (e.g., the communication member 320) and each portion of the cords 326 extending between the spindles 322 and the hinge guides 302 is of equal length.

At the 180-degree orientation, the length $L_F$ of the flexible display (112, FIG. 1) and the length $L_D$ of the device are equal. Recall that the length of the flexible display can be fixed and cam be secured to both sides of the device (e.g., the first and second portions 102 and 104 of FIG. 1). The changes in the Gap G in the various orientations represented in FIGS. 5A-5E show how the hinge assembly 106 can change the length of the device to accommodate the length of the flexible display at the various orientations.

Figure 5D:
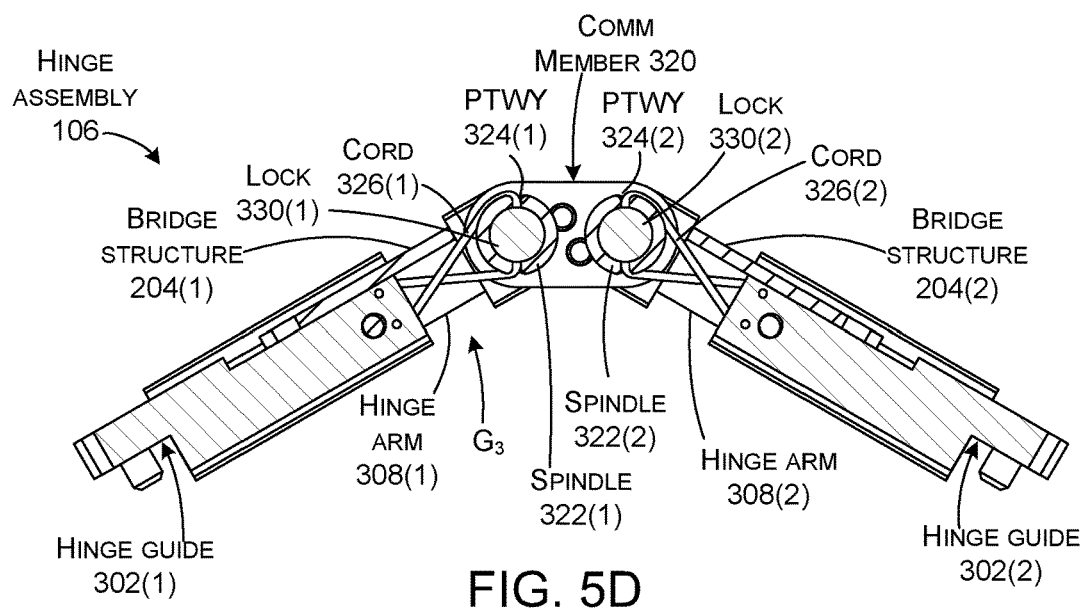

FIG. 5D shows the hinge assembly 106 at the 240-degree orientation. At this orientation, the pathways 324 experienced by the cords 326 is longer than in the 180-degree orientation of FIG. 5C and shorter than in the 60-degree orientation of FIG. 5B. As such, springs 312 (FIG. 3C) can bias the hinge guides 302 an intermediate distance away from the communication member 320. This movement is evidenced by gap $G_3$ between the hinge guides 302 and the hinge arms 308 being larger than gaps $G_1$ and smaller than gaps $G_2$ at the orientations of FIGS. 5B and 5C, respectively.

Figure 5E:
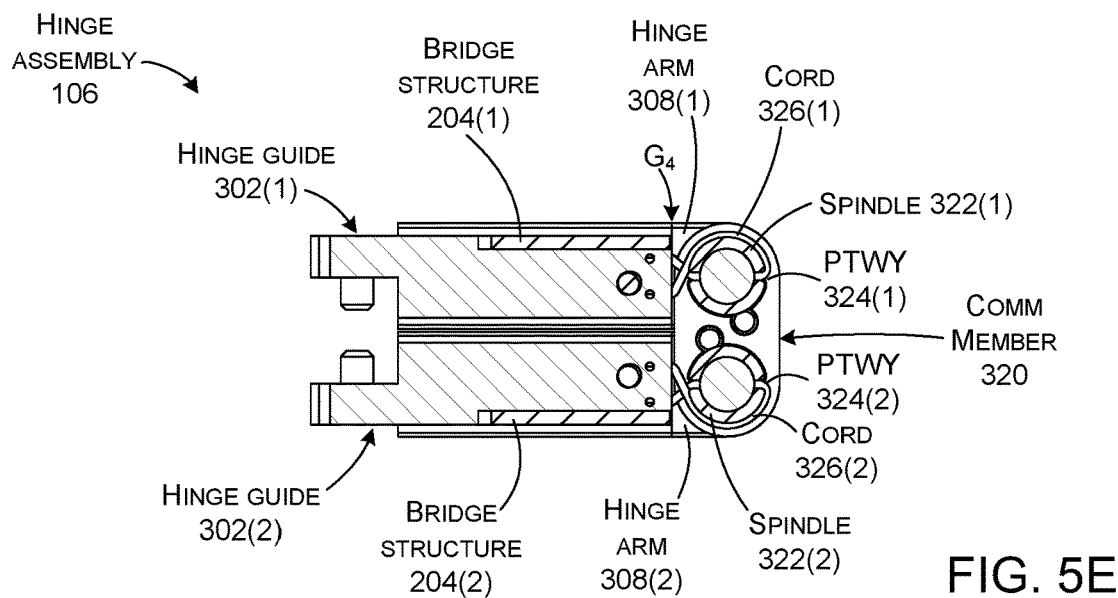

FIG. 5E shows the hinge assembly 106 at the 360-degree orientation, which is similar to the zero-degree orientation of FIG. 5A, but with the bridge structures 204 facing outwards. At this orientation, the pathways 324 experienced by the cords 326 is similar to that of FIG. 5A where the path through the spindles 322 is at a right angle to the ends of the hinge guides 302. This creates a longer pathway than FIG. 5D and the cords 326 overcome the bias and pull the hinge guides 302 against the hinge arms 308, such that gap $G_4$ is once again zero. Note that while hinge assembly 106 facilitates a 360-degree range of rotation, other implementations may facilitate a lesser range of rotation.

In this implementation, the hinge assembly 106 is slideably secured to the first and second portions 102 and 104 and the combined length changes as the orientation of the first and second portions changes. Other implementations could accomplish length changes between the hinge assembly and the first portion or the second portion, rather than both the first and second portions.

FIGS. 6A-6B, 7A-7B, and FIGS. 8A-8D collectively show another example hinge assembly 106A. The suffix 'A' is utilized to convey that in this example when compared to hinge assembly 106, elements may be changed, deleted, and/or added. For sake of brevity, only specific elements are reintroduced in the discussion that follows.

Figure 6A:
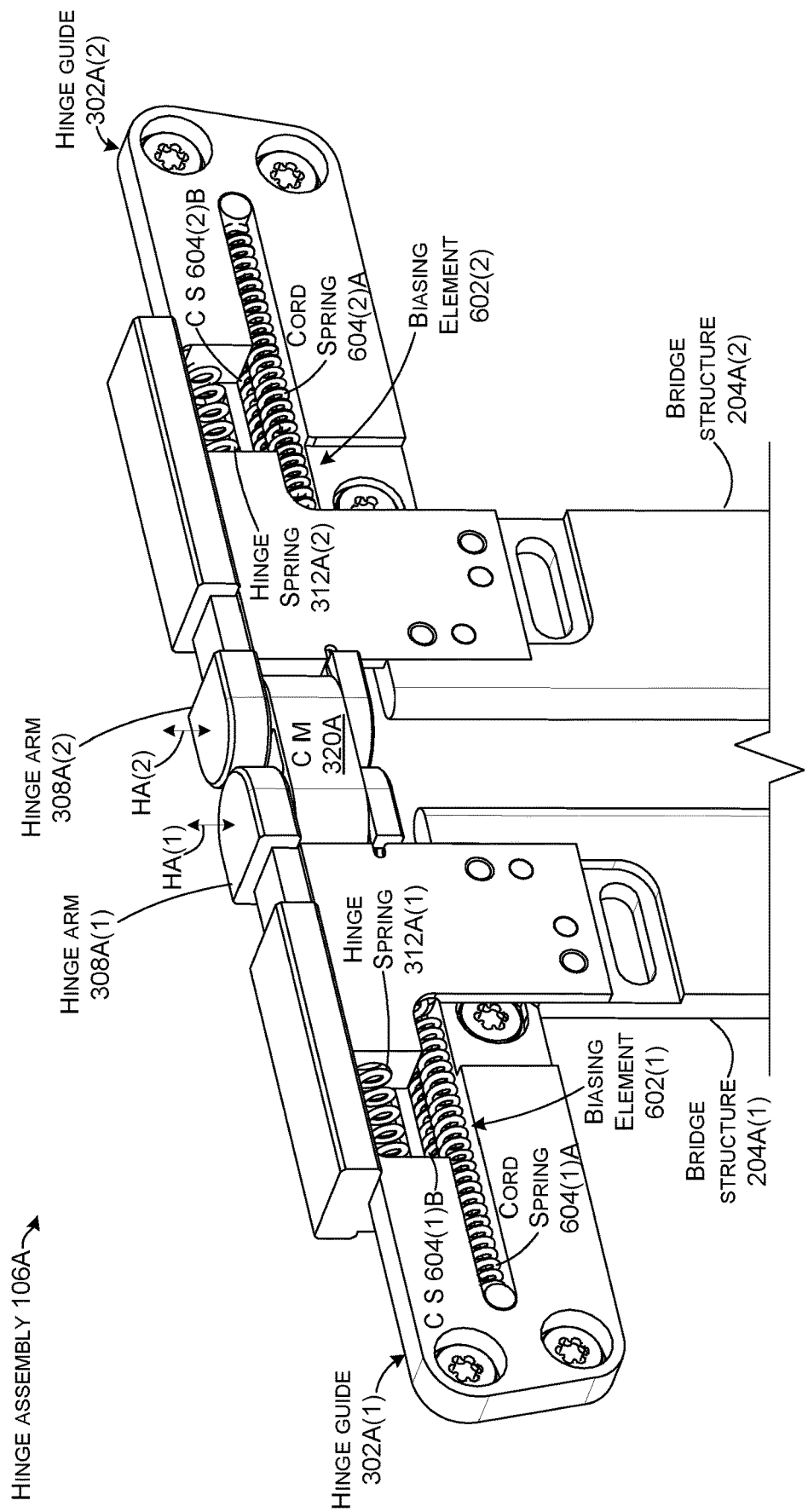
Figure 6B:
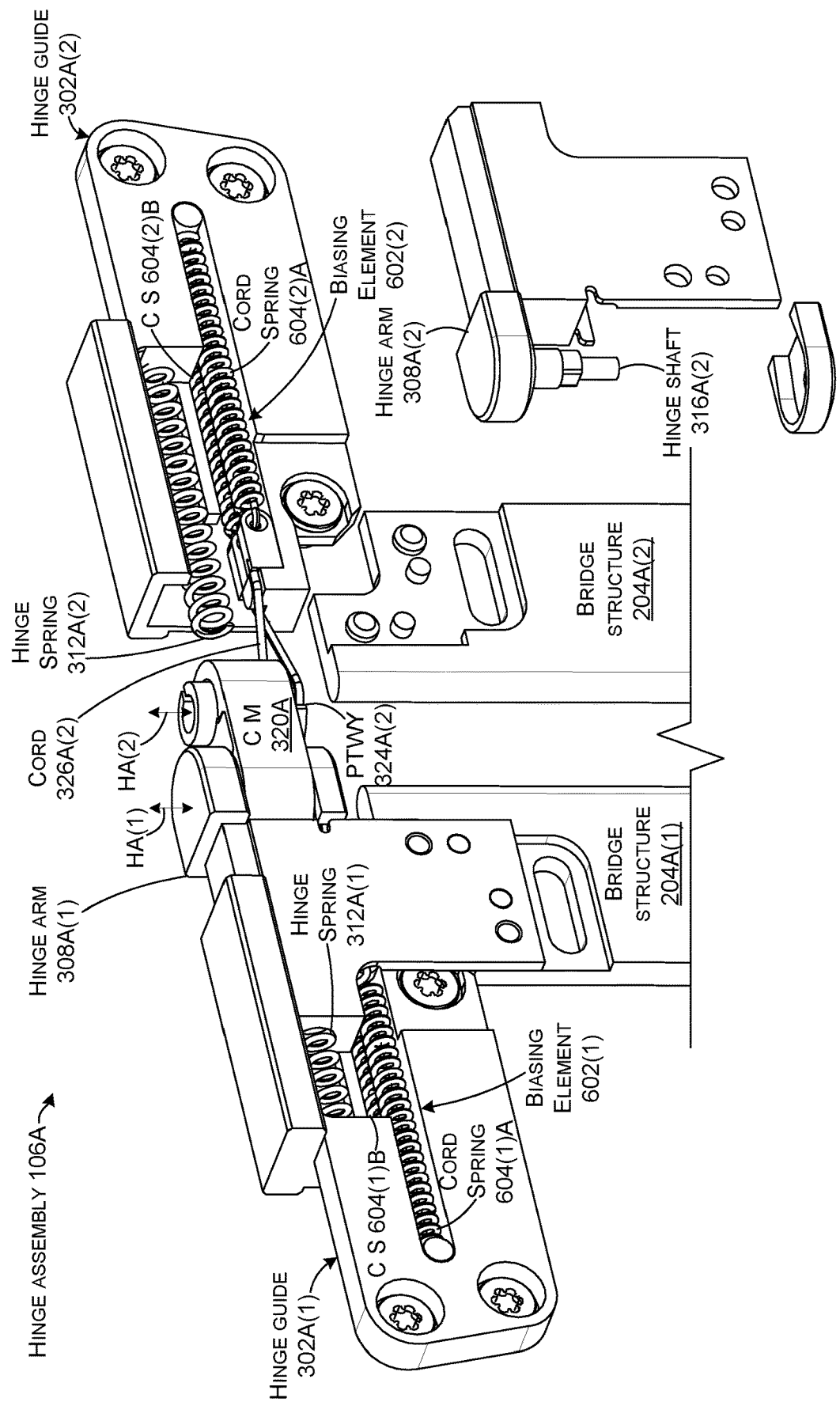
Figure 7A:
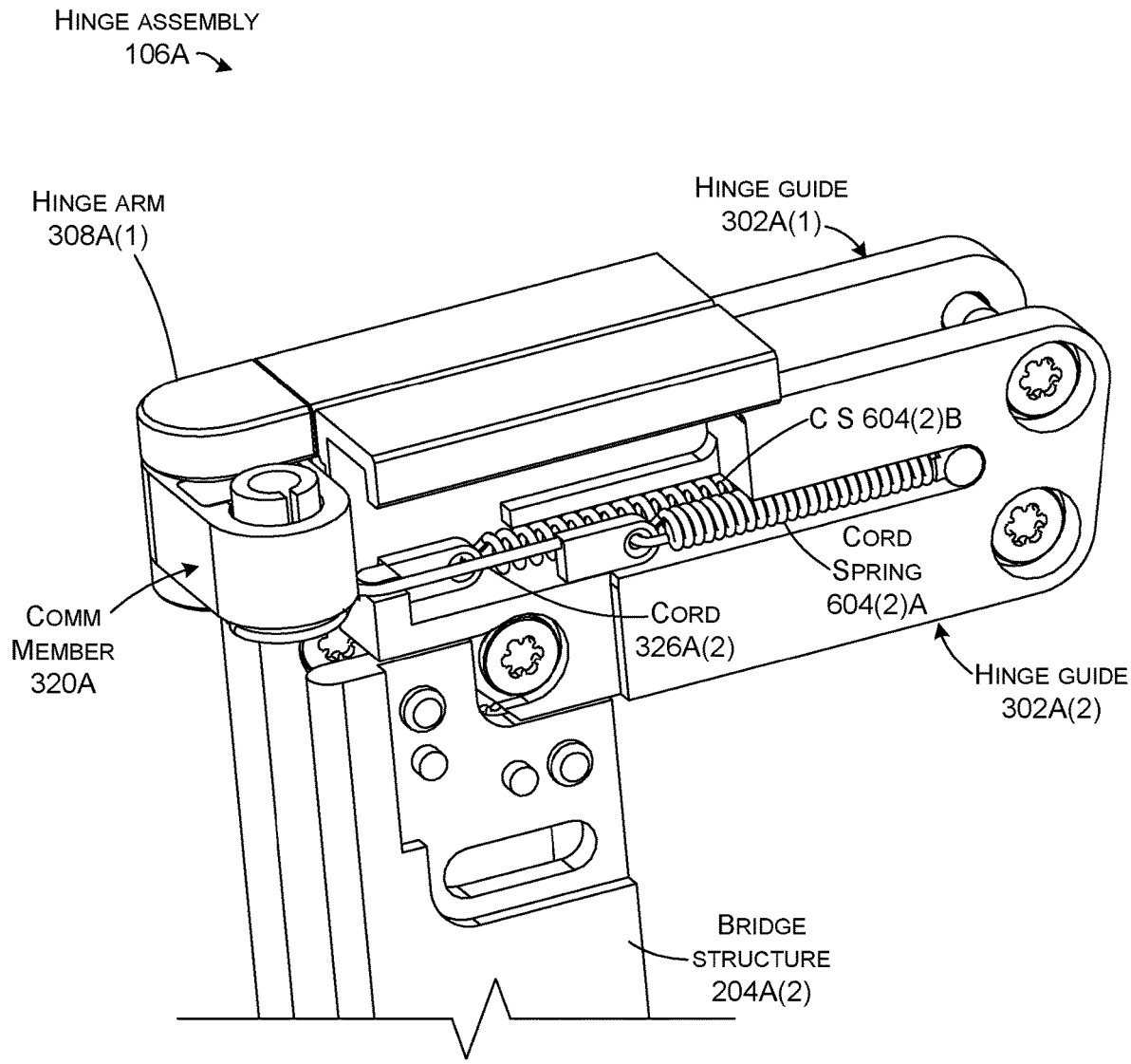
Figure 7B:
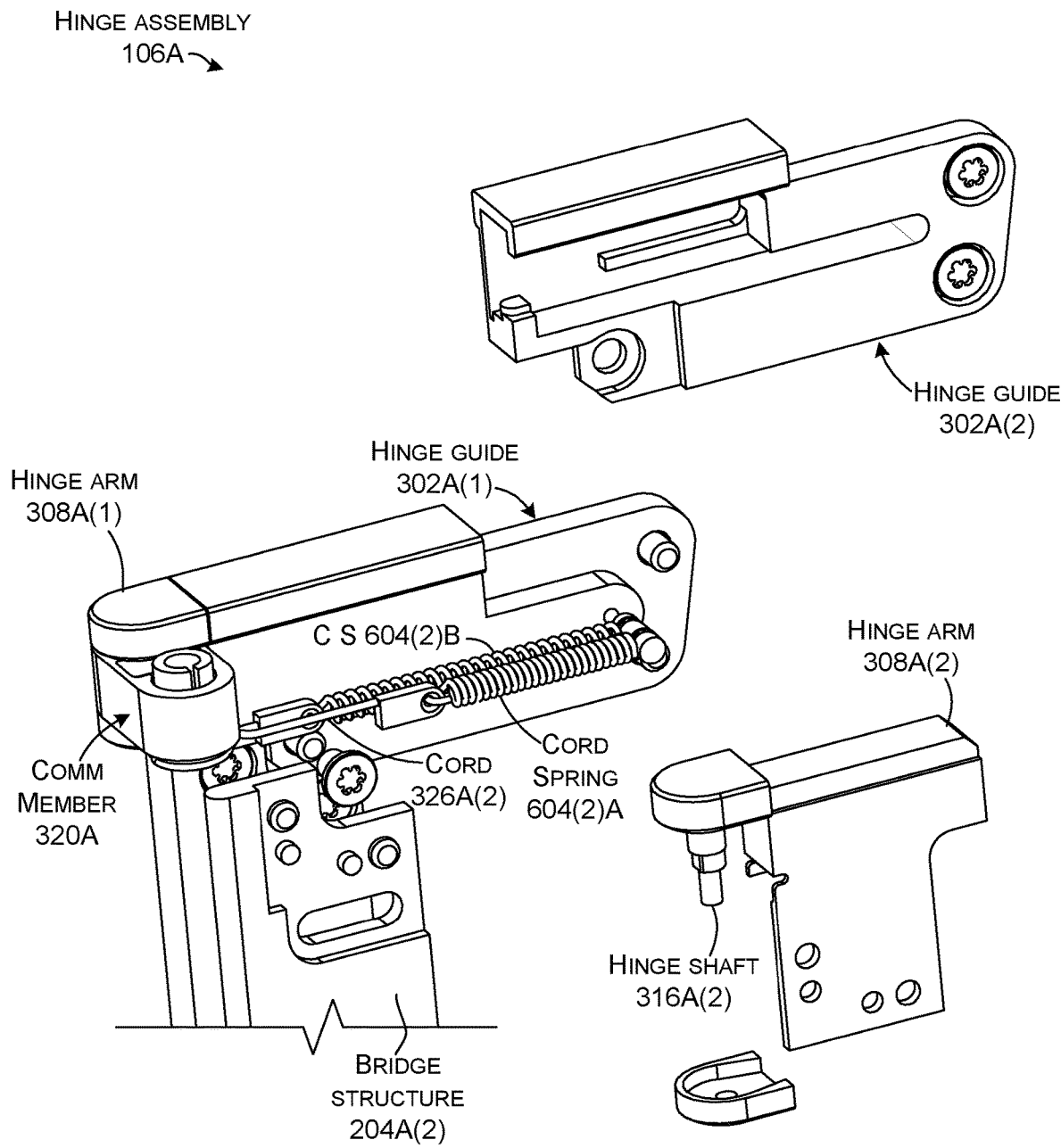

FIGS. 6A-6B show hinge assembly 106A at the 180-degree orientation. FIG. 6A is a perspective view and FIG. 6B is an exploded perspective view. FIGS. 7A-7B show hinge assembly 106A at the zero-degree orientation. FIG. 7A is a perspective view with some components removed, FIG. 7B is a similar exploded perspective view.

Example hinge assembly 106A can include hinge guides 302A that can slideably receive hinge arms 308A. Hinge springs 312A can bias the hinge guides 302A and the hinge arms 308A apart (e.g., away) from one another. Communication member 320A can define a portion of the pathways 324A experienced by cord 326A. In this example, the communication member can define spindles 322A that define a portion of the pathways 324A.

In the implementation described above relative to FIGS. 3A-5E, the ends of the cords were directly secured to the hinge guides via locks. In the current implementation, the ends of the cords 326A are secured to biasing elements 602, such as cord springs 604. The cord springs 604, in turn, are secured to the hinge guides 302A. Recall that the hinge springs 312A bias the hinge guides 302A and the hinge arms 308A away from one another. In contrast, the cord springs 604 bias the hinge guides toward the hinge arms (e.g., place the cords under tension). At any given orientation, the pathway 324A experienced by the cords 326A determine the overall relative positions (e.g., amount of gap G) of the hinge arms and the hinge guides.

Figure 8A:
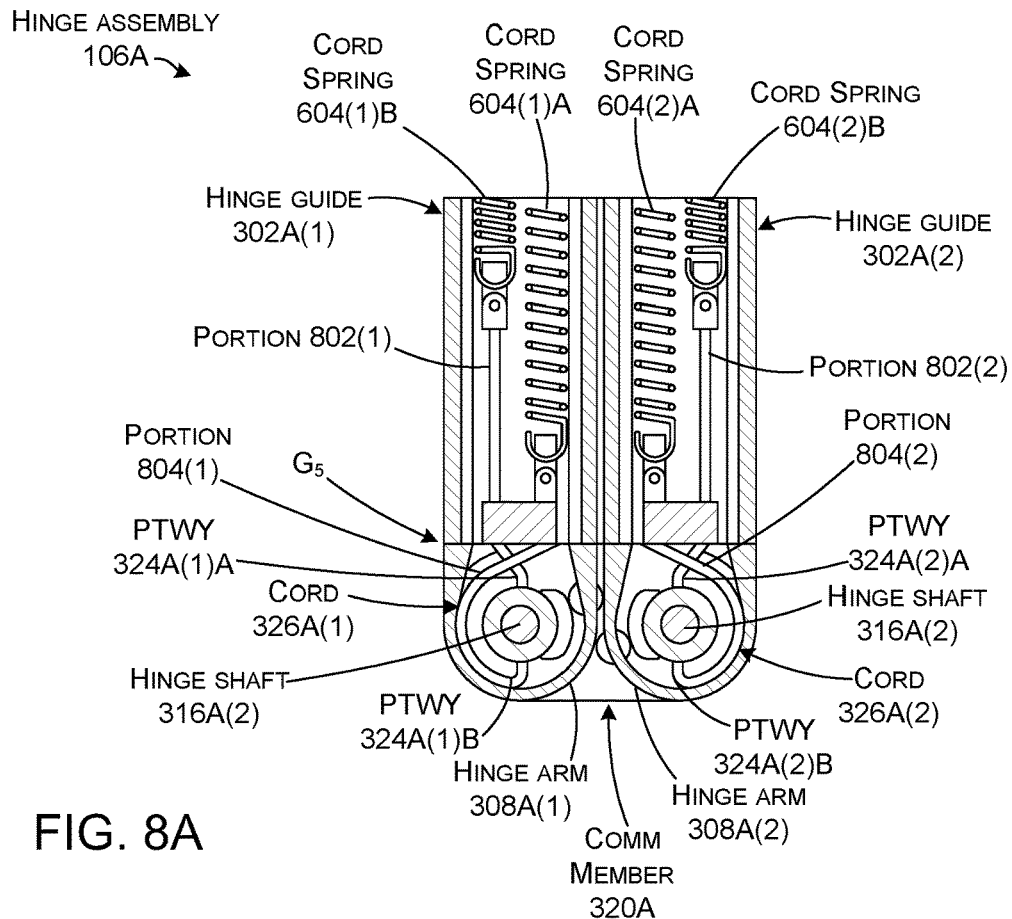

FIG. 8A shows the hinge assembly 106A in a zero-degree or closed orientation. At this orientation, a portion 802 of the cords 326A between the hinge shafts 316A and the outer cord springs 604(1)B and 604(2)B experience a relatively shorter pathway 324A(1)A and 324A(2)A than a pathway 324A(1)B and 324A(2)B experienced by a portion 802 between the hinge shafts 316A and the inner cord springs 604(1)A and 604(2)A. As such, cord springs 604(1)B and 604(2)B can contract toward the hinge guides 302A (e.g., away from the communication member 320A). The other portion 804 of the cords 326A experience a relatively long pathway 324A(1)B and 324A(2)B and pull cord springs 604(1)A and 604(2)A toward the communication member 320A. In turn, the cord springs 604(1)A and 604(2)A create a bias on the hinge guides 302A which pulls the hinge guides toward the communication member 320A. In this case, the cord springs 604(1)A and 604(2)A pull the hinge guides 302A against the hinge arms 308A so there is no gap $G_5$ between them.

Figure 8B:
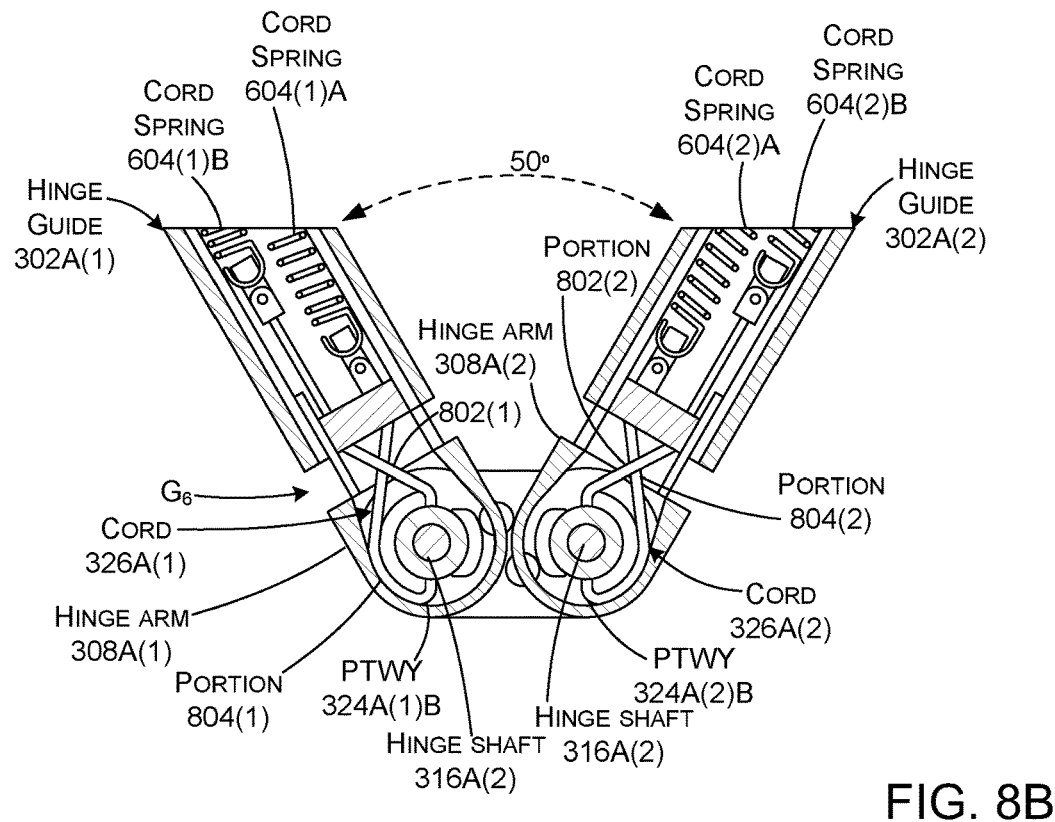

In FIG. 8B equal rotation has occurred around each hinge shaft 316A until the orientation is about 50 degrees. At this orientation, the pathways 324A(1)B and 324A(2)B experienced by the cord portions 804(1) and 804(2) is shorter than in the zero-degree orientation of FIG. 8A. This reduction in the pathway decrease the cords' pull on cord springs 604(1)A and 604(2)A. As such, the hinge springs 312A can bias the hinge guides 302A slightly away from the hinge arms 308A as indicated by gap $G_6$ being larger than gap $G_5$ of FIG. 8A.

Figure 8C:
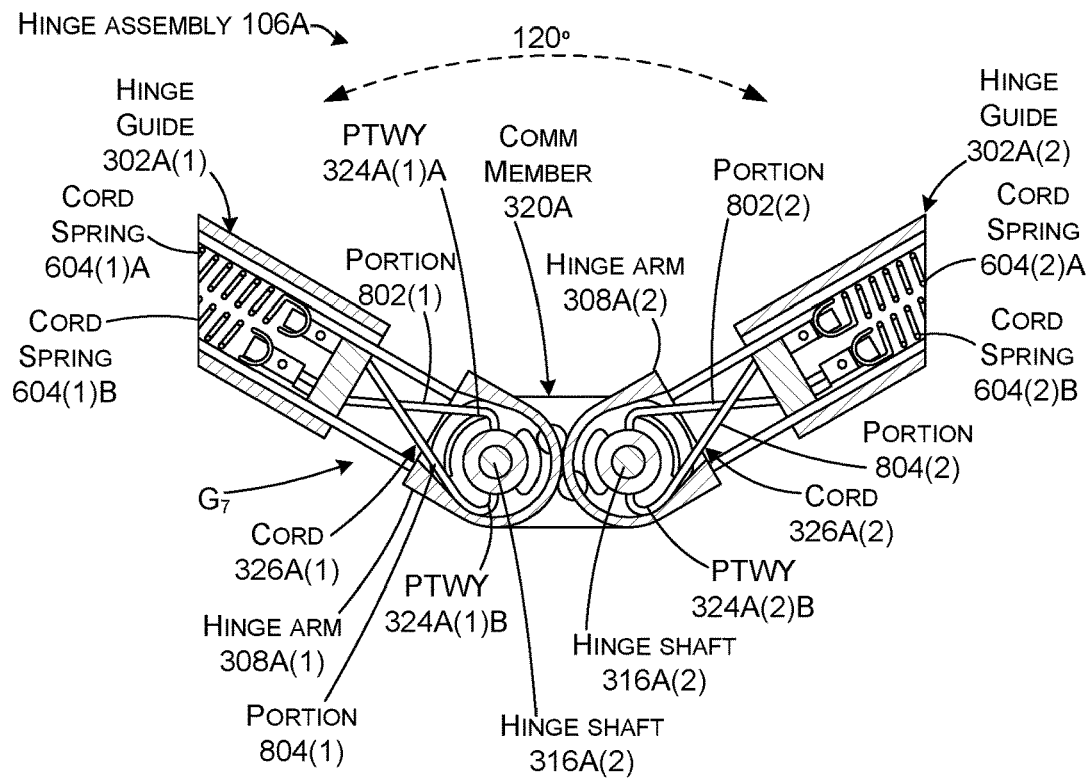

In FIG. 8C equal rotation has occurred around each hinge shaft 316A until the orientation is about 120 degrees. At this orientation, the pathways 324A(1)B and 324A(2)B experienced by the cord portions 804(1) and 804(2) is shorter than in the 50-degree orientation of FIG. 8A. This reduction in the pathway decrease the cords' pull on cord springs 604(1)A and 604(2)A. As such, the hinge springs 312A can bias the hinge guides 302A away from the hinge arms 308A as indicated by gap $G_7$ being larger than gap $G_6$ of FIG. 8B.

Figure 8D:
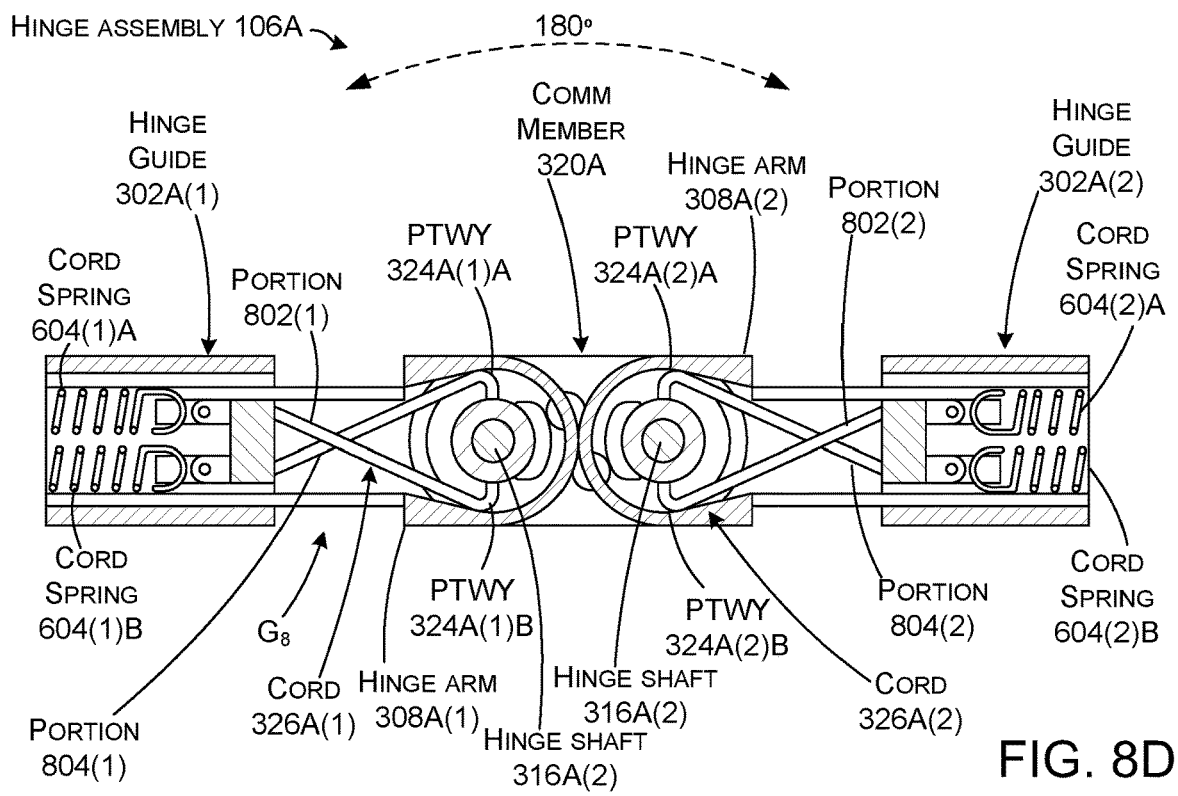

In FIG. 8D the hinge guides 302A are oriented 180 degrees from one another. At this orientation, the pathways 324A(1)B and 324A(2)B experienced by the cord portions 804(1) and 804(2) are generally equal to pathways 324A(1)A and 324A(2)A experienced by the cord portions 802(1) and 802(2). The pathways 324A are relatively short. The relatively short pathways allow hinge springs (312A, FIG. 6B) to bias the hinge guides 302A away from the communication member 320A (e.g., away from the hinge arms as evidenced by wide gap $G_8$). Rotation can continue past the 180-degree orientation. In that range, pathways 324A(1)A and 324A(2)A will progressively lengthen and pathways 324A(1)B and 324A(2)B will progressively shorten.

The implementations described above relative to FIGS. 3A-5E secure the cord directly to the first and second portions (e.g., the hinge guides 302). A relatively inelastic cord material can be employed. For instance, the cord can be manifest as a metal wire, a braided metal wire (e.g., cable or wire rope), or a synthetic material can be employed. The synthetic material can be a single strand or multiple strands. For example, woven nylon or polyethylene can be utilized. The cross-sectional shape of the cord can be round, flattened, or some other shape, such as a V-belt shape.

The implementations described above relative to FIGS. 6A-8D employ a generally inelastic cord in combination with a biasing element. For instance, in these implementations, the cord can be secured to the biasing element, which in turn can be secured to the hinge guides 302A. In these configurations, the cord and associated biasing elements can work in concert with hinge biasing elements to generate the gap G at a given orientation. Still further implementations can employ an elastic cord that contributes to defining gap G at a given orientation. The Gap G can define a length of the device underlying the flexible display and thereby avoid imparting stresses on the flexible display during rotation.

FIGS. 9A-10C collectively show an alternative example deformable member 124B employed on device 100B. In this case, the deformable member 124B is positioned between the flexible display 1128 and the bridge structures 204B of hinge assembly 106B. A flexible cover 902 is positioned opposite the flexible display. The flexible cover 902 can cosmetically cover the hinge assembly 106B and/or prevent foreign materials from entering the hinge assembly/device.

In this implementation the deformable member 124B includes a cavity defining element 904. The cavity defining element 904 can define one or more cavities 906 that can contain a fluid 908. The cavity defining element 904 can be any type of flexible material, such as various polymers, that is impermeable to fluids (seals fluids within the cavity 906). The fluid 908 can be any type of gas or liquid. In the illustrated implementation, the fluid 908 is a semi-viscous fluid that moves slowly within the cavity at operating temperatures of the device. For example, the fluid could be an oil, such as a vegetable oil, among other fluids.

Figure 9A:
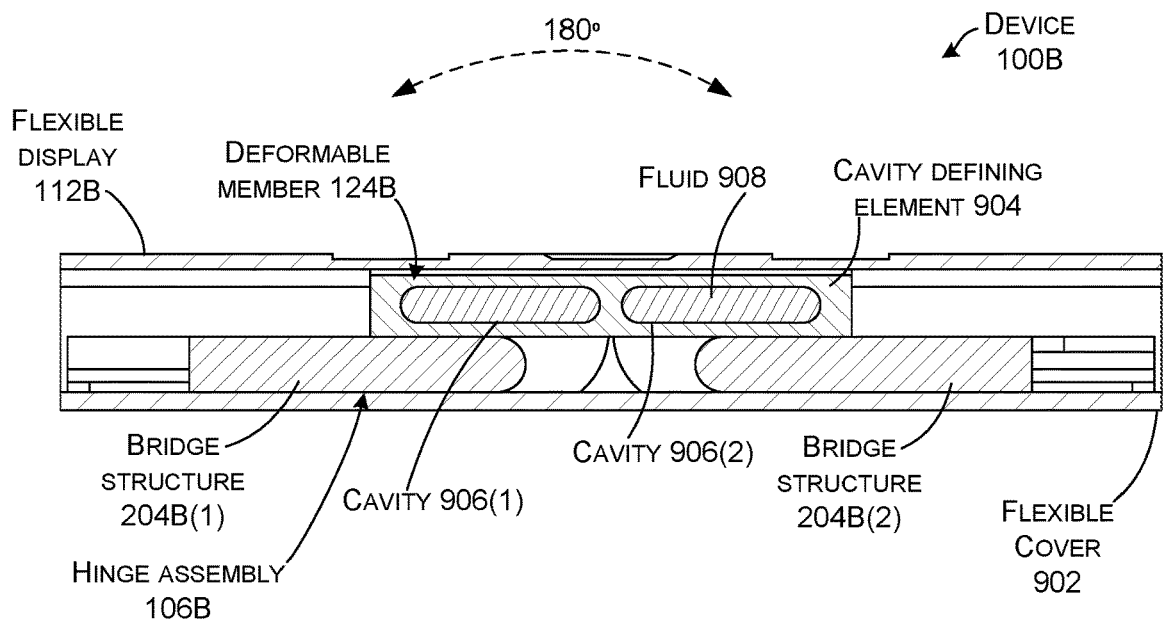

As shown in FIG. 9A, the deformable member 124B can support the flexible display 112B in the 180-degree orientation so that the flexible display has a generally uniform feel (e.g., area over hinge assembly feels the same as areas over the first and second portions).

Figure 9B:
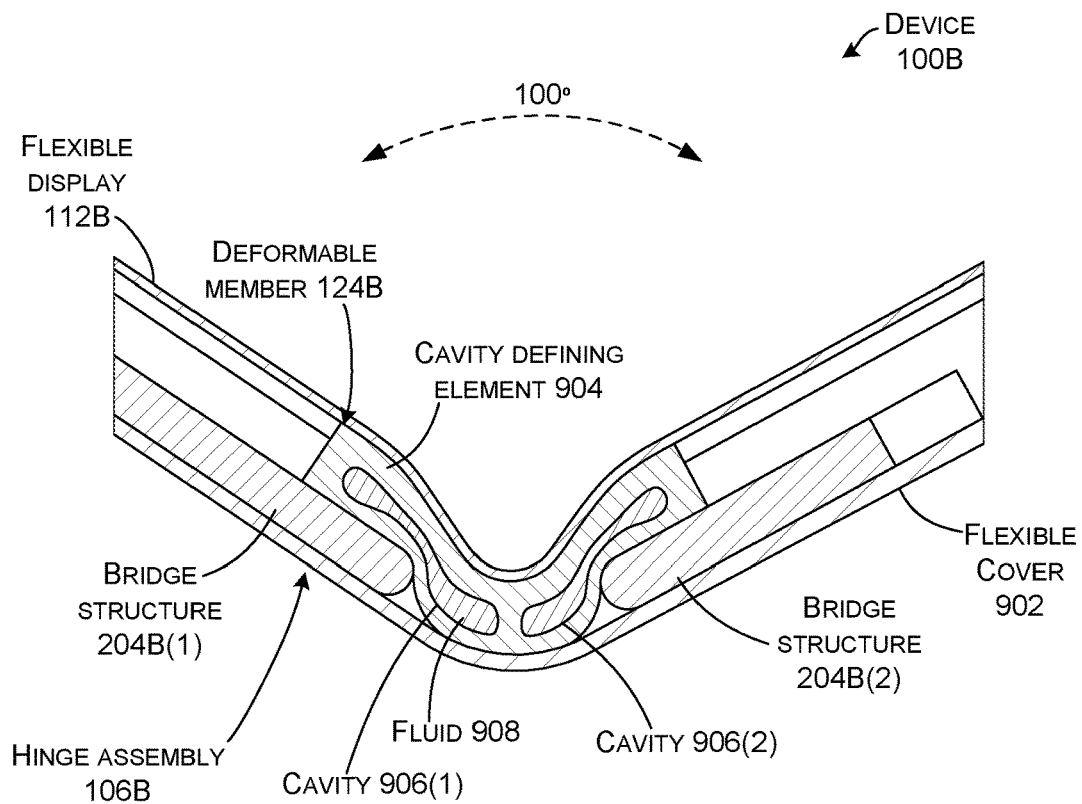

FIG. 9B shows movement of fluid 908 can allow the deformable member 124B to assume a shape that accommodates the flexible display 112B in other orientations, such as this 100-degree orientation.

FIGS. 10A-10C show views of the flexible display 112B and the deformable member 124B in the zero-degree (e.g., closed) orientation. The fluid filled deformable member 124B can deform so that the flexible display 112B can maintain a minimum bend radius R that will not damage the deformable member.

Individual elements of the hinge assemblies 106 can be made from various materials, such as metals, plastics, foams, polymers, and/or composites. These materials can be prepared in various ways, such as in the form of sheet metals, die cast metals, machined metals, 3D printed materials, molded or 3D printed plastics, and/or molded or 3D printed composites, among others, or any combination of these (and/or other) materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various examples are described above. Additional examples are described below. One example includes a device comprising a first portion and a second portion, a hinge assembly slideably secured to the first portion and the second portion, and a flexible display secured to the first portion and the second portion. The device also comprises a first biasing element that biases the first portion away from the hinge assembly, a second biasing element that biases the second portion away from the hinge assembly, a first cord that extends along a first pathway between the first portion and the hinge assembly, and a second cord that extends along a second pathway between the second portion and the hinge assembly; lengths of the first and second pathways changing as the first and second portions are rotated around the hinge assembly such that at a zero-degree orientation between the first and second portions the first and second cords overcome the biases of the first and second biasing elements and pull the first and second portions toward the hinge assembly and at a 180-degree orientation between the first and second portions the first and second biasing elements bias the first and second portions away from the hinge assembly.

Another example can include any of the above and/or below examples where the hinge assembly is slideably secured to the first portion and the second portion, or where the hinge assembly is slideably secured to the first portion and fixedly secured to the second portion.

Another example can include any of the above and/or below examples where the first and second cords function in combination with the first and second biasing elements to match a length of the device to a length of the flexible display.

Another example includes a device comprising a first portion and a second portion, a hinge assembly secured to the first portion and the second portion, a flexible display secured to the first portion and the second portion, a biasing element that biases the first portion away from the hinge assembly, and a cord that extends along a pathway between the first portion and the hinge assembly. A length of the pathway changing as the first and second portions are rotated around the hinge assembly, such that at a 180-degree orientation between the first and second portions the pathway is relatively shorter and the cord allows the biasing element to bias the first portion away from the second portion and at a zero-degree orientation between the first and second portions the pathway is relatively longer and the cord overcomes the bias of the biasing element and pulls the first portion toward the hinge assembly.

Another example can include any of the above and/or below examples where the hinge assembly is slideably secured to the first portion and the second portion, or where the hinge assembly is slideably secured to the first portion and fixedly secured to the second portion.

Another example can include any of the above and/or below examples where the device further comprises a deformable member positioned between the hinge assembly and the flexible display.

Another example can include any of the above and/or below examples where the deformable member comprises an encapsulated fluid.

Another example can include any of the above and/or below examples where the encapsulated fluid is semi-viscous.

Another example can include any of the above and/or below examples where the biasing element comprises a spring.

Another example can include any of the above and/or below examples where the spring is compressed between the first portion and the hinge assembly.

Another example can include any of the above and/or below examples where the cord is secured to the first portion.

Another example can include any of the above and/or below examples where the cord is under tension.

Another example can include any of the above and/or below examples where the cord is secured to a tensioning element that extends between the first portion and the cord.

Another example can include any of the above and/or below examples where the cord extends from a first end to a second end, the first end of the cord is secured to a first end of a first tensioning spring and a second end of the first tensioning spring is secured to the first portion, and the second end of the cord is secured to a first end of a second tensioning spring and a second end of the second tensioning spring is secured to the first portion.

Another example can include any of the above and/or below examples where the hinge assembly defines a hinge axis that the first portion rotates around and the pathway intersects the hinge axis.

Another example includes a device comprising a first portion and a second portion, a hinge assembly secured to the first portion and the second portion, a flexible display secured to the first portion and the second portion, a biasing element that biases the first portion away from the hinge assembly, and a cord that extends along a pathway between the first portion and the hinge assembly; a length of the pathway changing as the first and second portions are rotated around the hinge assembly, such that at a first orientation the biasing element biases the first portion away from the hinge assembly and at a second orientation, and the cord overcomes the bias and pulls the first portion toward the hinge assembly.

Another example can include any of the above and/or below examples where the hinge assembly defines a 360-degree range of rotation between the first portion and the second portion, and wherein the pathway is relatively shorter at a zero-degree orientation than at a 360-degree orientation.

Another example can include any of the above and/or below examples where the device further comprises a deformable member positioned between the flexible display and the hinge assembly.

Another example can include any of the above and/or below examples where the device further comprises bridge structures positioned between the deformable member and the hinge assembly.

Another example can include any of the above and/or below examples where the cord is elastic or wherein the cord is inelastic.

Various methods of manufacture, assembly, and/or use for hinge assemblies and devices are contemplated beyond those shown above relative to FIGS. 1-10C.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
a first portion and a second portion;
a hinge assembly slideably secured to the first portion and the second portion;
a flexible display secured to the first portion and the second portion;
a first biasing element that biases the first portion away from the hinge assembly;
a second biasing element that biases the second portion away from the hinge assembly;
a first cord that extends along a first pathway between the first portion and the hinge assembly; and,
a second cord that extends along a second pathway between the second portion and the hinge assembly; lengths of the first and second pathways changing as the first and second portions are rotated around the hinge assembly such that at a zero-degree orientation between the first and second portions the first and second cords overcome the biases of the first and second biasing elements and pull the first and second portions toward the hinge assembly and at a 180-degree orientation between the first and second portions the first and second biasing elements bias the first and second portions away from the hinge assembly.

2. The device of claim 1, wherein the hinge assembly is slideably secured to the first portion and the second portion, or where the hinge assembly is slideably secured to the first portion and fixedly secured to the second portion.

3. The device of claim 1, wherein the first and second cords function in combination with the first and second biasing elements to match a length of the device to a length of the flexible display.

4. A device, comprising:
a first portion and a second portion;
a hinge assembly secured to the first portion and the second portion;
a flexible display secured to the first portion and the second portion;
a biasing element that biases the first portion away from the hinge assembly; and,
a cord that extends along a pathway between the first portion and the hinge assembly; a length of the pathway changing as the first and second portions are rotated around the hinge assembly, such that at a 180-degree orientation between the first and second portions the pathway is relatively shorter and the cord allows the biasing element to bias the first portion away from the second portion and at a zero-degree orientation between the first and second portions the pathway is relatively longer and the cord overcomes the bias of the biasing element and pulls the first portion toward the hinge assembly.

5. The device of claim 4, wherein the hinge assembly is slideably secured to the first portion and the second portion, or where the hinge assembly is slideably secured to the first portion and fixedly secured to the second portion.

6. The device of claim 4, further comprising a deformable member positioned between the hinge assembly and the flexible display.

7. The device of claim 6, wherein the deformable member comprises an encapsulated fluid.

8. The device of claim 7, wherein the encapsulated fluid is semi-viscous.

9. The device of claim 4, wherein the biasing element comprises a spring.

10. The device of claim 9, wherein the spring is compressed between the first portion and the hinge assembly.

11. The device of claim 4, wherein the cord is secured to the first portion.

12. The device of claim 4, wherein the cord is under tension.

13. The device of claim 4, wherein the cord is secured to a tensioning element that extends between the first portion and the cord.

14. The device of claim 4, wherein the cord extends from a first end to a second end, the first end of the cord is secured to a first end of a first tensioning spring and a second end of the first tensioning spring is secured to the first portion, and the second end of the cord is secured to a first end of a second tensioning spring and a second end of the second tensioning spring is secured to the first portion.

15. The device of claim 4, wherein the hinge assembly defines a hinge axis that the first portion rotates around and the pathway intersects the hinge axis.

16. A device, comprising:
a first portion and a second portion;
a hinge assembly secured to the first portion and the second portion;
a flexible display secured to the first portion and the second portion;
a biasing element that biases the first portion away from the hinge assembly; and,
a cord that extends along a pathway between the first portion and the hinge assembly; a length of the pathway changing as the first and second portions are rotated around the hinge assembly, such that at a first orientation the biasing element biases the first portion away from the hinge assembly and at a second orientation, and the cord overcomes the bias and pulls the first portion toward the hinge assembly.

17. The device of claim 16, wherein the hinge assembly defines a 360-degree range of rotation between the first portion and the second portion, and wherein the pathway is relatively shorter at a zero-degree orientation than at a 360-degree orientation.

18. The device of claim 16, further comprising a deformable member positioned between the flexible display and the hinge assembly.

19. The device of claim 18, further comprising bridge structures positioned between the deformable member and the hinge assembly.

20. The device of claim 16, wherein the cord is elastic or wherein the cord is inelastic.

* * * * *